US012707349B2

(12) United States Patent
Ramachandra et al.

(10) Patent No.: US 12,707,349 B2
(45) Date of Patent: Aug. 11, 2026

(54) REPORTING INTER-RAT MOBILITY FAILURES

(71) Applicant: Telefonaktiebolaget LM Ericsson (publ), Stockholm (SE)

(72) Inventors: Pradeepa Ramachandra, Linköping (SE); Marco Belleschi, Solna (SE); Ali Parichehrehteroujeni, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 389 days.

(21) Appl. No.: 18/259,361

(22) PCT Filed: Dec. 27, 2021

(86) PCT No.: PCT/SE2021/051313

§ 371 (c)(1),
(2) Date: Jun. 26, 2023

(87) PCT Pub. No.: WO2022/159015

PCT Pub. Date: Jul. 28, 2022

(65) Prior Publication Data

US 2024/0172062 A1 May 23, 2024

Related U.S. Application Data

(60) Provisional application No. 63/140,266, filed on Jan. 22, 2021.

(51) Int. Cl.
*H04W 36/00* (2009.01)
*H04W 36/08* (2009.01)
(Continued)

(52) U.S. Cl.
CPC ..... *H04W 36/00833* (2023.05); *H04W 36/08* (2013.01); *H04W 36/1443* (2023.05); *H04W 36/305* (2018.08)

(58) Field of Classification Search
CPC ....... H04W 36/0079; H04W 36/00833; H04W 36/08; H04W 36/1443; H04W 36/305; H04W 76/16; H04W 76/19; H04W 88/06
See application file for complete search history.

(56) References Cited

U.S. PATENT DOCUMENTS 9,516,533 B2 12/2016 Xu et al.
2010/0173633 A1* 7/2010 Catovic ............. H04W 36/0083 455/436
2021/0211952 A1* 7/2021 Teyeb ................. H04W 36/305

FOREIGN PATENT DOCUMENTS

EP 2395791 A2 12/2011
WO 2020076228 A2 4/2020
WO 2020197480 A1 10/2020

OTHER PUBLICATIONS

"3GPP TS 38.331 V16.6.0", 5G; NR; Radio Resource Control (RRC); Protocol specification, ETSI TS 138 331 V16.6.0 (Release 16), Oct. 2021, pp. 1-948.

(Continued)

*Primary Examiner* — Kashif Siddiqui

(74) *Attorney, Agent, or Firm* — Murphy, Bilak & Homiller, PLLC

(57) ABSTRACT

Embodiments include methods for a user equipment (UE) to report failure of an inter-radio access technology (RAT) mobility procedure from a source cell to a target cell. Such methods include receiving, from a source node serving the source cell, a command to perform an inter-RAT mobility procedure towards the target cell, which uses a different RAT than the source cell. Such methods include detecting a failure associated with the inter-RAT mobility procedure. The failure cause is either the UE was unable to comply with a configuration included in the command or a protocol error associated with inter-RAT information included in the command. Such methods include sending a failure report, including an indication of the failure cause, to a node serving a cell the UE connected to after detecting the failure. Other embodiments include complementary methods for network nodes, as well as UEs and network nodes configured to perform such methods.

16 Claims, 8 Drawing Sheets

(51) Int. Cl.
*H04W 36/14* (2009.01)
*H04W 36/30* (2009.01)

(56) References Cited

OTHER PUBLICATIONS

"Correction on mobility from NR failure for inter-RAT MRO EUTRA", 3GPP TSG-RAN WG2 Meeting #113-e, R2-2100184, Online, Jan. 25-Feb. 5, 2021, pp. 1-3.
"3GPP TS 36.331 v 15.7.0", 3rd Generation Partnership Project; Technical Specification Group Radio Access Network; Evolved Universal Terrestrial Radio Access (E-UTRA); Radio Resource Control (RRC); Protocol specification (Release 15), Sep. 2019, pp. 1-962.
"3GPP TS 38.423 V16.3.0", 3rd Generation Partnership Project; Technical Specification Group Radio Access Network; NG-RAN; Xn application protocol (XnAP) (Release 16), Sep. 2020, pp. 1-451.
"3GPP TS 38.331 V16.0.0", 3rd Generation Partnership Project; Technical Specification Group Radio Access Network; NR; Radio Resource Control (RRC) protocol specification (Release 16), Mar. 2020, pp. 1-835.
CATT, CMCC, "Further Considerations and Modifications on MRO in UE RLF Report", 3GPP TSG-RAN WG2 Meeting #110 electronic, R2-2004413, Online, Jun. 1-Jun. 12, 2020.

* cited by examiner

```
-- ASN1START
RLF-TimersAndConstants-r9 ::=  CHOICE {
    release                     NULL,
    setup                       SEQUENCE {
        t301-r9                 ENUMERATED {ms100, ms200, ms300, ms400, ms600, ms1000, ms1500, ms2000},
        t310-r9                 ENUMERATED {ms0, ms50, ms100, ms200, ms500, ms1000, ms2000},
        n310-r9                 ENUMERATED {n1, n2, n3, n4, n6, n8, n10, n20},
        t311-r9                 ENUMERATED {ms1000, ms3000, ms5000, ms10000, ms15000, ms20000, ms30000},
        n311-r9                 ENUMERATED {n1, n2, n3, n4, n5, n6, n8, n10},
        ...
    }
}
RLF-TimersAndConstants-r13 ::=  CHOICE {
    release                     NULL,
    setup                       SEQUENCE {
        t301-v1310              ENUMERATED {ms2500, ms3000, ms3500, ms4000, ms5000, ms6000, ms8000, ms10000},
        ...,
        [[  t310-v1330          ENUMERATED {ms4000, ms6000} OPTIONAL   -- Need ON
        ]]
    }
}
RLF-TimersAndConstantsSCG-r12 ::= CHOICE {
    release                        NULL,
    setup                          SEQUENCE {
        t313-r12                       ENUMERATED {ms0, ms50, ms100, ms200, ms500, ms1000, ms2000},
        n313-r12                       ENUMERATED {n1, n2, n3, n4, n6, n8, n10, n20},
        n314-r12                       ENUMERATED {n1, n2, n3, n4, n5, n6, n8, n10},
        ...
    }
}
-- ASN1STOP
```

FIG. 5

```
-- ASN1START
-- TAG-UEINFORMATIONRESPONSE-START
UEInformationResponse-r16 ::=     SEQUENCE {
    rrc-TransactionIdentifier       RRC-TransactionIdentifier,
    criticalExtensions              CHOICE {
        ueInformationResponse-r16      UEInformationResponse-r16-IEs,
        criticalExtensionsFuture       SEQUENCE {}
    }
}
UEInformationResponse-r16-IEs ::= SEQUENCE {
    measResultIdleEUTRA-r16         MeasResultIdleEUTRA-r16             OPTIONAL,
    measResultIdleNR-r16            MeasResultIdleNR-r16                OPTIONAL,
    logMeasReport-r16               LogMeasReport-r16                   OPTIONAL,
    connEstFailReport-r16           ConnEstFailReport-r16               OPTIONAL,
    ra-ReportList-r16               RA-ReportList-r16                   OPTIONAL,
    rlf-Report-r16                  RLF-Report-r16                      OPTIONAL,
    mobilityHistoryReport-r16       MobilityHistoryReport-r16           OPTIONAL,
    lateNonCriticalExtension        OCTET STRING                        OPTIONAL,
    nonCriticalExtension            SEQUENCE {}                         OPTIONAL
}
...
RLF-Report-r16 ::=                CHOICE {
    nr-RLF-Report-r16                  SEQUENCE {
        measResultLastServCell-r16      MeasResultRLFNR-r16,
        measResultNeighCells-r16        SEQUENCE {
            measResultListNR-r16            MeasResultList2NR-r16       OPTIONAL,
            measResultListEUTRA-r16         MeasResultList2EUTRA-r16    OPTIONAL
        }                                                  OPTIONAL,
        c-RNTI-r16                      RNTI-Value,
        previousPCellId-r16             CHOICE {
            nrPreviousCell-r16              CGI-Info-Logging-r16,
            eutraPreviousCell-r16           CGI-InfoEUTRALogging
        }                                                               OPTIONAL,
        failedPCellId-r16               CHOICE {
            nrFailedPCellId-r16             CHOICE {
                cellGlobalId-r16                CGI-Info-Logging-r16,
                pci-arfcn-r16                   SEQUENCE {
                    physCellId-r16                  PhysCellId,
                    carrierFreq-r16                 ARFCN-ValueNR
                }
            },
            eutraFailedPCellId-r16          CHOICE {
                cellGlobalId-r16                CGI-InfoEUTRALogging,
                pci-arfcn-r16                   SEQUENCE {
                    physCellId-r16                  EUTRA-PhysCellId,
                    carrierFreq-r16                 ARFCN-ValueEUTRA
                }
            }
        },
        reconnectCellId-r16             CHOICE {
            nrReconnectCellId-r16           CGI-Info-Logging-r16,
           eutraReconnectCellId-r16        CGI-InfoEUTRALogging
        }                                                               OPTIONAL,
        timeUntilReconnection-16        TimeUntilReconnection-16        OPTIONAL,
        reestablishmentCellId-r16       CGI-Info-Logging-r16            OPTIONAL,
        timeConnFailure-r16             INTEGER (0..1023)               OPTIONAL,
        timeSinceFailure-r16            TimeSinceFailure-r16,
        connectionFailureType-r16       ENUMERATED {rlf, hof},
        rlf-Cause-r16                   ENUMERATED {
                                      t310-Expiry, randomAccessProblem,
                                      rlc-MaxNumRetx, beamFailureRecoveryFailure,
                                      lbtFailure-r16, bh-rlfRecoveryFailure,pare2,
                                      spare1},
        locationInfo-r16                LocationInfo-r16                OPTIONAL,
        noSuitableCellFound-r16         ENUMERATED {true}               OPTIONAL,
        ra-InformationCommon-r16        RA-InformationCommon-r16        OPTIONAL
    },
```

FIG. 6A

```
    eutra-RLF-Report-r16             SEQUENCE {
        failedPCellId-EUTRA              CGI-InfoEUTRALogging,
        measResult-RLF-Report-EUTRA-r16  OCTET STRING
    }
}
...
-- TAG-UEINFORMATIONRESPONSE-STOP
-- ASN1STOP
```

FIG. 6B

```
RLF-Report-r16 ::=              CHOICE {
    nr-RLF-Report-r16               SEQUENCE {
        measResultLastServCell-r16     MeasResultRLFNR-r16,
        measResultNeighCells-r16       SEQUENCE {
            measResultListNR-r16          MeasResultList2NR-r16          OPTIONAL,
            measResultListEUTRA-r1        MeasResultList2EUTRA-r16       OPTIONAL
        }                                                                OPTIONAL,
        c-RNTI-r16                     RNTI-Value,
        previousPCellId-r16            CHOICE {
            nrPreviousCell-r16            CGI-Info-Logging-r16,
            eutraPreviousCell-r16         CGI-InfoEUTRALogging
        }                                                                OPTIONAL,
        failedPCellId-r16              CHOICE {
            nrFailedPCellId-r16           CHOICE {
                cellGlobalId-r16             CGI-Info-Logging-r16,
                pci-arfcn-r16                SEQUENCE {
                    physCellId-r16              PhysCellId,
                    carrierFreq-r16             ARFCN-ValueNR
                }
            },
            eutraFailedPCellId-r16        CHOICE {
                cellGlobalId-r16             CGI-InfoEUTRALogging,
                pci-arfcn-r16                SEQUENCE {
                    physCellId-r16              EUTRA-PhysCellId,
                    carrierFreq-r16             ARFCN-ValueEUTRA
                }
            }
        },
        reconnectCellId-r16            CHOICE {
            nrReconnectCellId-r16         CGI-Info-Logging-r16,
           eutraReconnectCellId-r16       CGI-InfoEUTRALogging
        }                                                                OPTIONAL,
        timeUntilReconnection-16       TimeUntilReconnection-16          OPTIONAL,
        reestablishmentCellId-r16      CGI-Info-Logging-r16              OPTIONAL,
        timeConnFailure-r16            INTEGER (0..1023)                 OPTIONAL,
        timeSinceFailure-r16           TimeSinceFailure-r16,
        connectionFailureType-r16      ENUMERATED {rlf, hof, inter-RAT-hof},
        rlf-Cause-r16                  ENUMERATED {
                                         t310-Expiry, randomAccessProblem,
                                         rlc-MaxNumRetx,beamFailureRecoveryFailure,
                                         lbtFailure-r16, bh-rlfRecoveryFailure,
                                         unableToComply, protocolError, spare2,
                                         spare1},
        locationInfo-r16               LocationInfo-r16               OPTIONAL,
        noSuitableCellFound-r16        ENUMERATED {true}              OPTIONAL,
        ra-InformationCommon-r16       RA-InformationCommon-r16       OPTIONAL
    },
    eutra-RLF-Report-r16            SEQUENCE {
        failedPCellId-EUTRA             CGI-InfoEUTRALogging,
        measResult-RLF-Report-EUTRA-r16 OCTET STRING
    }
}
```

FIG. 7

REPORTING INTER-RAT MOBILITY FAILURES

TECHNICAL FIELD

The present disclosure generally relates to mobility of user equipment (UEs) in wireless networks, and particularly relates to improvements in the UE reporting of failed inter-radio access technology (inter-RAT) mobility procedures (e.g., handovers) in a wireless network.

BACKGROUND

Currently the fifth generation ("5G") of cellular systems, also referred to as New Radio (NR), is being standardized within the Third-Generation Partnership Project (3GPP). NR is developed for maximum flexibility to support a variety of different use cases. These include enhanced mobile broadband (eMBB), machine type communications (MTC), ultra-reliable low latency communications (URLLC), side-link device-to-device (D2D), and several other use cases. While the present disclosure relates primarily to 5G/NR, the following description of fourth-generation Long-Term Evolution (LTE) technology is provided to introduce various terms, concepts, architectures, etc. that are also used in 5G/NR.

LTE is an umbrella term that refers to radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that can with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 115 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MMEs 134 and 138 via respective S6a interfaces.

In some embodiments, HSS 131 can communicate with a user data repository (UDR)-labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2 illustrates a block diagram of an exemplary control plane (CP) protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both CP and user plane (UP), as well as other UP functions such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE does not belong to any cell, no RRC context has been established for the UE (e.g., in E-UTRAN), and the UE is out of UL synchronization with the network. Even so, a UE in RRC_IDLE state is known in the EPC and has an assigned IP address.

Furthermore, in RRC_IDLE state, the UE's radio is active on a discontinuous reception (DRX) schedule configured by upper layers. During DRX active periods (also referred to as "On durations"), an RRC_IDLE UE receives system information (SI) broadcast by a serving cell, performs measurements of neighbor cells to support cell reselection, and monitors a paging channel for pages from the EPC via an eNB serving the cell in which the UE is camping.

A UE must perform a random-access (RA) procedure to move from RRC_IDLE to RRC_CONNECTED state. In RRC_CONNECTED state, the cell serving the UE is known and an RRC context is established for the UE in the serving eNB, such that the UE and eNB can communicate. For example, a Cell Radio Network Temporary Identifier (C-RNTI)—a UE identity used for signaling between UE and network—is configured for a UE in RRC_CONNECTED state.

LTE Rel-12 introduced dual connectivity (DC) whereby a UE in RRC_CONNECTED state can be connected to two network nodes simultaneously, thereby improving connection robustness and/or capacity. In LTE DC, these two network nodes are referred to as "Master eNB" (MeNB) and "Secondary eNB" (SeNB), or more generally as master node (MN) and secondary node (SN). More specifically, a UE is configured with a Master Cell Group (MCG) associated with the MN and a Secondary Cell Group (SCG) associated with the SN. Each of the CGs is a group of serving cells that includes one MAC entity, a set of logical channels with associated RLC entities, a primary cell (PCell or PSCell), and optionally one or more secondary cells (SCells).

Fifth-generation (5G) NR technology shares many similarities with fourth-generation LTE. Like LTE, NR DL and UL physical resources are organized into equal-sized 1-ms subframes, each subframe is further divided into multiple slots of equal duration, and each slot includes multiple OFDM-based symbols. As another example, NR RRC layer includes RRC_IDLE and RRC_CONNECTED states and an additional state known as RRC_INACTIVE, which has some properties similar to a "suspended" condition used in LTE. NR also utilizes signaling radio bearers (SRBs) and data radio bearers (DRBs) in a similar manner as LTE.

In addition to providing coverage via "cells," as in LTE, NR base stations (e.g., gNBs or ng-eNBs) also provide coverage via "beams." In general, a DL "beam" is a coverage area of a network-transmitted reference signals (RS) that may be measured or monitored by a UE. In NR, for example, such RS can include any of the following, alone or in combination: synchronization signal/PBCH block (SSB), channel state information RS (CSI-RS), positioning RS (PRS), demodulation RS (DM-RS), phase-tracking reference signals (PTRS), etc. In general, SSB is available to all UEs regardless of RRC state, while other RS (e.g., CSI-RS, DM-RS, PTRS) are associated with specific UEs that have a network connection, i.e., in RRC_CONNECTED state.

NR also supports various DC scenarios, including NR-DC that is similar to LTE-DC discussed above, except that both the MN and SN (referred to as "gNBs") employ the NR interface to communicate with the UE. In addition, NR supports various multi-RAT DC (MR-DC) scenarios, whereby a compatible UE can be configured to utilize resources from a first node providing E-UTRA/LTE access and a second node providing NR access. One node acts as the MN (e.g., providing MCG) and the other as the SN (e.g., providing SCG), with the MN and SN being connected via a network interface and at least the MN being connected to a core network (e.g., EPC or 5GC).

Seamless mobility is a key feature of 3GPP radio access technologies (RATs). In general, a network configures a UE to perform and report radio resource management (RRM) measurements to assist network-controlled mobility decisions, such as for handover from a serving cell to a neighbor cell. Seamless handovers ensure that the UE moves around in the coverage area of different cells without causing too many interruptions in data transmission. However, there will be scenarios when the network fails to handover the UE to the "correct" neighbor cell in time, which can cause the UE will declare radio link failure (RLF) or handover failure (HOF). This can occur before the UE sends a measurement report in a source cell, before the UE receives a handover command to a target cell, shortly after the UE executes a successful handover to the target cell, or upon a Handover Failure (HOF) to the target cell (e.g., upon expiry of timer T304, started when the UE starts synchronization with the target cell).

An RLF reporting procedure was introduced as part of the mobility robustness optimization (MRO) in LTE Rel-9. In this procedure, a UE logs relevant information at the time of RLF and later reports such information to the network via a target cell to which the UE ultimately connects (e.g., after reestablishment). The reported information can include RRM measurements of various neighbor cells prior to the mobility operation (e.g., handover).

SUMMARY

An NR UE can perform handover between NR cells, as well as from (to) an NR source cell to (from) a target cell that uses another RAT, such as LTE (E-UTRA) or UMTS (UTRA). This is referred to as an "inter-RAT handover". However, there are various problems, issues, and/or difficulties associated with UE RLF reporting after the UE fails to perform an inter-RAT handover.

Embodiments of the present disclosure provide improvements to reporting of inter-RAT mobility procedures (e.g., handovers) in a wireless network, such as by facilitating solutions to overcome the exemplary problems summarized above and described in more detail below.

Embodiments of the present disclosure include methods (e.g., procedures) for reporting failure of an inter-RAT mobility procedure from a source cell to a target cell in a wireless network (e.g., E-UTRAN, NG-RAN). These exemplary methods can be performed by a user equipment (UE, e.g., wireless device, MTC device, NB-IoT device, modem, etc. or component thereof).

These exemplary methods can include receiving, from a source node serving the source cell, a command to perform an inter-RAT mobility procedure towards the target cell. The target cell uses a different RAT than the source cell. These exemplary methods can also include detecting a failure associated with the inter-RAT mobility procedure, where the failure cause is one of the following:

- that the UE was unable to comply with a configuration included in the command, or
- a protocol error associated with inter-RAT information included in the command.

These exemplary methods can also include sending a failure report, including an indication of the failure cause, to a node serving a cell in which the UE re-establishes a connection with the wireless network after the failed inter-RAT mobility procedure. In some embodiments, the failure report can be a radio link failure (RLF) report (e.g., RLF-Report-r16).

In some embodiments, the inter-RAT mobility procedure can be one of the following: handover, conditional handover, dual active protocol stack (DAPS) handover, dual-connectivity (DC) setup, DC modification. In some embodiments, the source cell uses a New Radio (NR) RAT, and the target cell uses a UTRA RAT or an evolved UTRA (E-UTRA) RAT. In other embodiments, the source cell uses an E-UTRA RAT, and the target cell uses an NR RAT. In some embodiments, the failure report can also include a failure type indication, which indicates that the failure is associated with an inter-RAT handover.

In some embodiments, the UE can be in dual connectivity with a master cell group (MCG) and a secondary cell group (SCG) before receiving the command, such that the failure is associated with the MCG or the SCG. In such embodiments, one of the following applies to the failure report:

- it can be a message specific to the cell group associated with the failure; or
- it indicates whether the failure is associated with the MCG or with the SCG.

In some embodiments, the indication of the failure cause can be an explicit indication in the failure report or an implicit indication that is based on including first information associated with the failure (i.e., in the failure report) and omitting second information not associated with the failure (i.e., from the failure report). In some of these embodiments, the first information can include an indication of handover failure and the second information can be information about random access to the target cell (e.g., indicating that no random access was performed). In some embodiments, the first information can also include an identity of the target cell.

Other embodiments include methods (e.g., procedures) for handling failed inter-RAT mobility procedures of a UEs in a wireless network. These exemplary methods can be performed by a network node (e.g., base station, eNB, gNB, ng-eNB, etc., or component thereof) serving a cell in the wireless network (e.g., E-UTRAN, NG-RAN).

These exemplary methods can include can receiving a failure report about a UE's failed inter-RAT mobility procedure from a source cell served by a source node to a target cell served by a target node. The target cell uses a different RAT than the source cell. The failure report also indicates one of the following failure causes:

- that the UE was unable to comply with a configuration included in a command to perform the mobility procedure, or
- a protocol error associated with inter-RAT information included in the command.

In some embodiments, the failure report can be an RLF report (e.g., RLF-Report-r16). These exemplary methods can also include, based on the failure cause indication, performing one or more operations that prevent failures in subsequent mobility procedures involving the source cell and/or the target cell.

In some embodiments, the failure report can be received by the source node from a node serving a further cell in which the UE connected to the wireless network after the failed inter-RAT mobility procedure. In such embodiments, the one or more operations can include refraining from requesting subsequent mobility procedures towards the target cell for UEs served by the source cell; and/or sending the failure cause indication to the target node.

In other embodiments, the failure report can be received from the UE by a node serving a further cell in which the UE connected to the wireless network after the failed inter-RAT mobility procedure. In such embodiments, the one or more operations can include sending the failure report to the source node; determining the target node based on an identifier of the target cell included in the failure report; and/or when the indicated failure cause is the protocol error, sending the failure cause indication the to the determined target node.

In some embodiments, the inter-RAT mobility procedure can be one of the following: handover, conditional handover, DAPS handover, DC setup, or DC modification. In some embodiments, the source cell uses an NR RAT, and the target cell uses a UTRA RAT or an E-UTRA RAT. In other embodiments, the source cell uses an E-UTRA RAT, and the target cell uses an NR RAT. In some embodiments, the failure report can also include a failure type indication, which indicates that the failure is associated with an inter-RAT handover.

In some embodiments, the UE can be in dual connectivity with an MCG and an SCG before the failed inter-RAT mobility procedure, which is associated with either the MCG or the SCG. In such embodiments, one of the following applies to the failure report:

- it can be a message specific to the cell group associated with the failure; or
- it indicates whether the failure is associated with the MCG or with the SCG.

In some embodiments, the indication of the failure cause can be an explicit indication in the failure report. In other embodiments, these exemplary methods can also include determining the failure cause based on first information associated with the failure, that is included in the failure report; and on second information, not associated with the failure, that is omitted from the failure report. In some of these embodiments, the first information can include an indication of handover failure) and the second information can be information about random access to the target cell (e.g., indicating that no random access was performed). In some embodiments, the first information can also include an identity of the target cell.

Other embodiments include user UEs (e.g., wireless devices, MTC devices, NB-IoT devices, or components thereof, such as a modem) and network nodes (e.g., base stations, eNBs, gNBs, ng-eNBs, etc., or components thereof) configured to perform operations corresponding to any of the exemplary methods described herein. Other embodiments include non-transitory, computer-readable media storing program instructions that, when executed by processing circuitry, configure such UEs or network nodes to perform operations corresponding to any of the exemplary methods described herein.

These and other embodiments described herein provide efficient and unambiguous techniques for reporting causes of failed UE inter-RAT mobility procedures in a radio link failure (RLF) report. By receiving such information, a RAN node can unambiguously detect and/or determine the RLF cause, including various inter-RAT handover failure conditions. Accordingly, RAN nodes can take remedial action based on this information, including fixing a condition that caused the failure and/or refraining from future handovers to the target cell in which the failure occurred. Consequently, such techniques can reduce and/or eliminate inter-RAT mobility failures, thus improving UE mobility in a RAN.

These and other objects, features, benefits, and advantages of embodiments of the present disclosure will become apparent upon reading the following Detailed Description in view of the Drawings briefly described below.

BRIEF DESCRIPTION OF THE DRAWINGS

FIG. 5 shows an exemplary ASN.1 data structure for an RLF-TimersAndConstants information element (IE).

FIG. 6, which includes FIGS. 6A-B, shows an exemplary ASN.1 data structure for a UEInformationResponse message.

FIG. 7 shows an exemplary ASN.1 data structure for an RLF-Report-r16 IE, according to various embodiments of the present disclosure.

DETAILED DESCRIPTION

Figure 1:
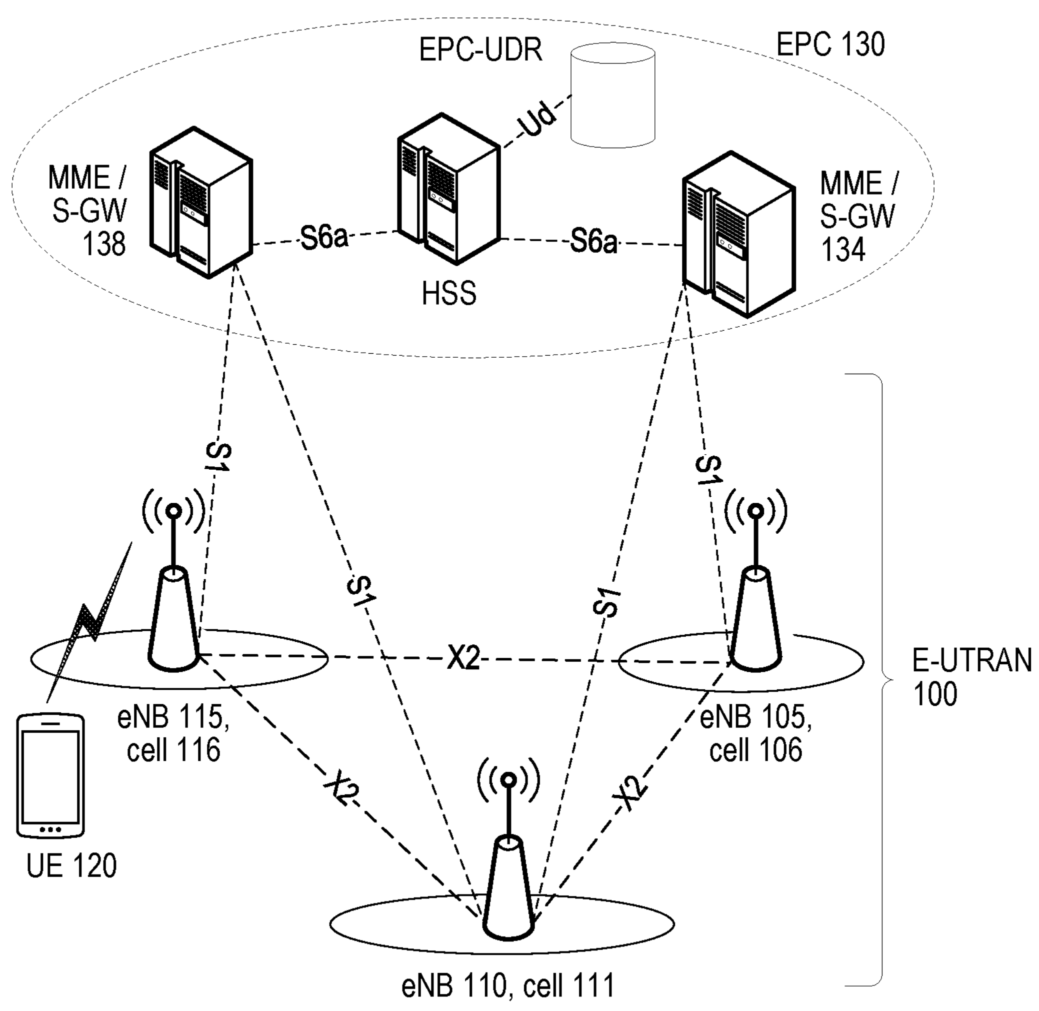
FIG. 1 is a high-level block diagram of an exemplary LTE network architecture.
Figure 2:
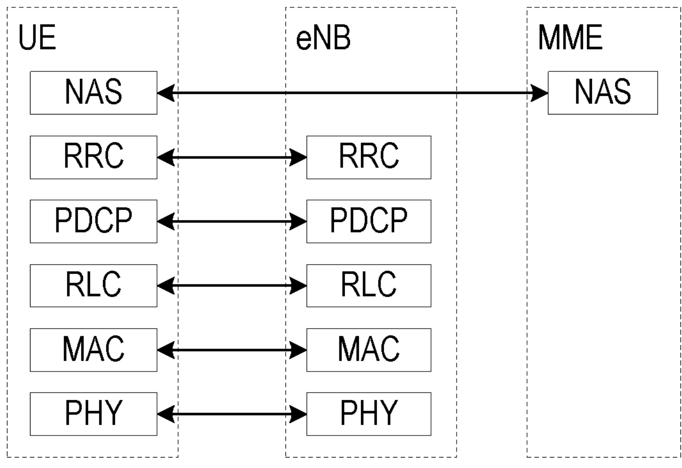
FIG. 2 is a block diagram of exemplary LTE control plane (CP) protocol stack.

Embodiments summarized above will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

- Radio Node: As used herein, a "radio node" can be either a "radio access node" or a "wireless device."
- Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.
- Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (SMF), a location management function (LMF), a user plane function (UPF), a Network Exposure Function (NEF), or the like.
- Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).
- Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, an NR UE can perform handover between NR cells, as well as from (to) an NR source cell to (from) a target cell that uses another RAT, such as LTE (EUTRA) or UMTS (UTRA). This is referred to as an "inter-RAT handover". However, there are various problems, issues, and/or difficulties associated with UE RLF reporting after the UE fails to perform an inter-RAT handover. This is discussed in more detail below.

In RRC_CONNECTED state, the network typically configures the UE to perform and report RRM measurements to assist network-controlled mobility decisions such as handover from one cell to another. A RLF procedure is typically triggered in the UE when something unexpected happens in any of the mobility-related procedures, including handover. The RLF procedure involves interactions between RRC and lower layer protocols such as PHY (or L1), MAC, RLC, etc. including radio link monitoring (RLM) on L1.

Upon handover failure (HOF) and RLF, the UE may take autonomous actions such as trying to select a cell and initiate reestablishment so the UE can remain reachable by the network. In general, a UE declares RLF only when the UE realizes that there is no reliable communication channel (or radio link) available between itself and the network, which can result in poor user experience. Also, reestablishing the connection requires signaling with a newly selected cell (e.g., random access procedure, exchanging various RRC messages, etc.), introducing latency until the UE can again reliably transmit and/or receive user data with the network.

According to 3GPP TS 36.331 (v15.7.0), the possible causes for RLF include:

1) Radio link problem indicated by PHY (e.g., expiry of RLM-related timer T310);
2) Expiry of a measurement reporting timer (e.g., T312), due to not receiving a HO command from the network while the timer is running despite sending a measurement report;
3) Random access problem indicated by MAC entity; and
4) Reaching a maximum number of RLC retransmissions.

Since RLF leads to reestablishment in a new cell and degradation of UE/network performance and end-user experience, it is in the interest of the network to understand the reasons for UE RLF and to optimize mobility-related parameters (e.g., trigger conditions of measurement reports) to reduce, minimize, and/or avoid subsequent RLFs. Before Rel-9 mobility robustness optimizations (MRO), only the UE was aware of radio quality at the time of RLF, the actual reason for declaring RLF, etc. To identify the RLF cause, the network requires more information from the UE and from the neighboring base stations (e.g., eNBs).

As noted above, various issues and/or problems can trigger RLF in LTE and NR. However, for the purposes of the present disclosure, the two most important are: 1) RLF due to radio link or PHY problem; and 2) RLF due to random access problem, as indicated by MAC layer. Although RLF can be triggered by other causes, discussion of these causes is omitted for brevity and/or simplicity.

The principle of RLM is similar in LTE and NR. In general, the UE monitors link quality of the UE's serving cell and uses that information to decide whether the UE is in-sync (IS) or out-of-sync (OOS) with respect to that serving cell. In LTE, RLM is carried out by the UE measuring downlink reference signals (e.g., CRS) in RRC_CONNECTED state. If RLM (i.e., by L1/PHY) indicates number of consecutive OOS conditions to the UE RRC layer, then RRC starts a radio link failure (RLF) procedure and declares RLF after expiry of a timer (e.g., T310). The L1 RLM procedure is carried out by comparing the estimated CRS measurements to some target block error rates (BLERs), called Qout and Qin. These values correspond to BLER of hypothetical PDCCH/PCIFCH transmissions from the serving cell, with exemplary values of 10% and 2%, respectively. In NR, the network can define the RS type (e.g., CSI-RS and/or SSB), exact resources to be monitored, and even the BLER target for IS and OOS indications.

Figures 3, 4:
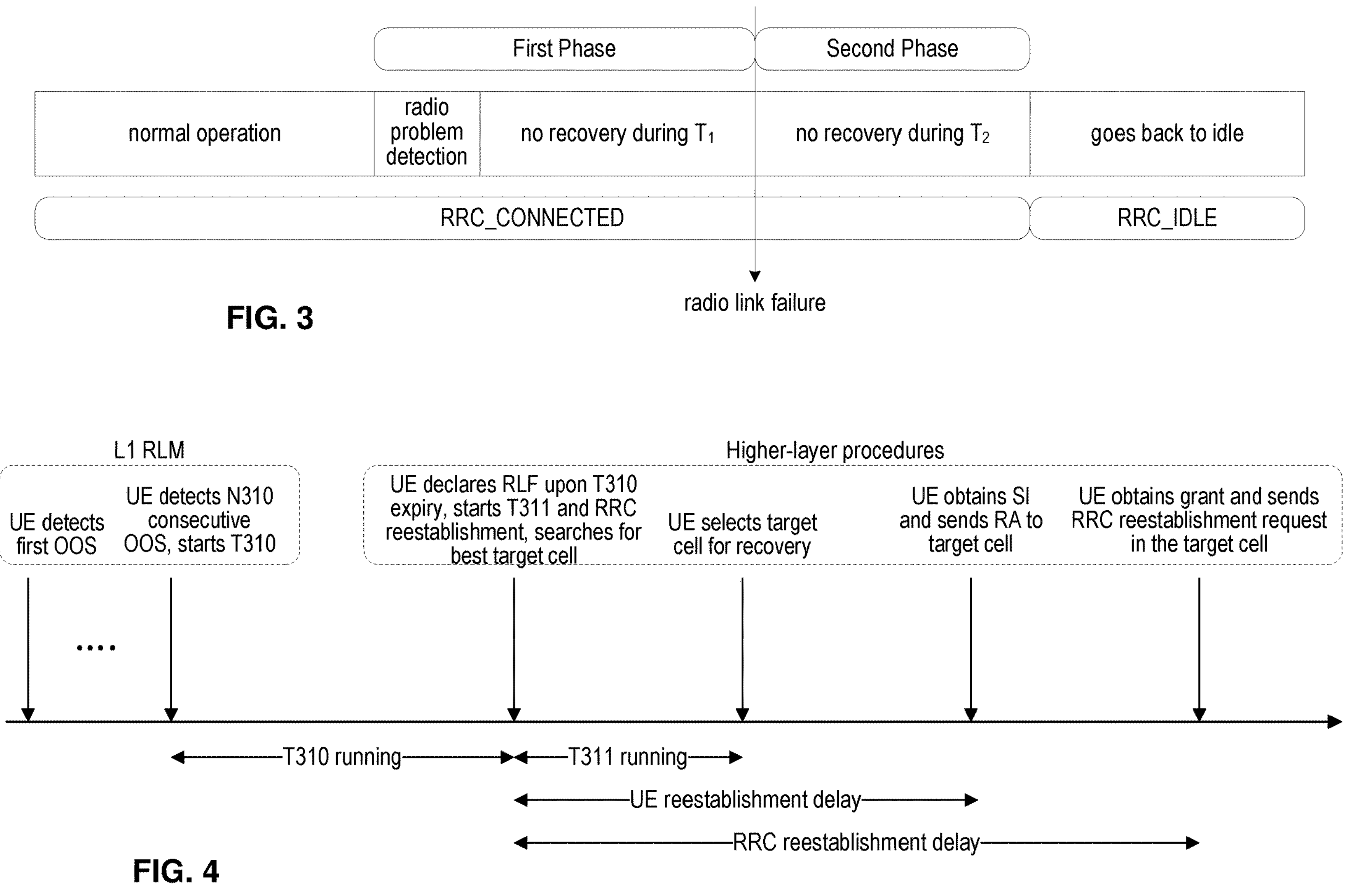
FIG. 3 shows a high-level timing diagram illustrating two phases of an exemplary radio link failure (RLF) procedure in LTE and NR, according to various embodiments of the present disclosure.
FIG. 4 shows a more detailed version of a UE's operations during an exemplary LTE RLF procedure.

FIG. 3 shows a high-level timing diagram illustrating the two phases of a RLF procedure in LTE and NR. The first phase starts upon radio problem detection and leads to radio link failure detection after no recovery is made during a period T1. The second phase starts upon RLF detection or handover failure and ends with the UE returning to RRC_IDLE if no recovery is made during a period T2.

FIG. 4 shows a more detailed version of the UE's operations during an exemplary LTE RLF procedure. In this example, the UE detects N310 consecutive OOS conditions during L1 RLM procedures, as discussed above, and then initiates timer T310. Subsequent operations are performed by higher layers (e.g., RRC). After expiry of T310, the UE starts T311 and RRC reestablishment, searching for the best target cell. After selecting a target cell for reestablishment, the UE obtains system information (SI) for the target cell and performs a random access (e.g., via RACH). The duration from T310 expiry until this point is considered the UE's reestablishment delay. Ultimately, the UE obtains access to the target cell and sends an RRC Reestablishment Request message to the target cell. The duration after T310 expiry until this point can be considered the total RRC reestablishment delay.

These operations are further specified in 3GPP TS 36.331 (v15.7.0), a relevant portion of which is provided in the excerpt below.

* Begin excerpt from 3GPP specification *

5.2.2.9 Actions Upon Reception of SystemInformationBlockType2

Upon receiving SystemInformationBlockType2, the UE shall:

1> apply the configuration included in the radioResourceConfigCommon;

. . .

1> if in RRC_CONNECTED and UE is configured with RLF timers and constants values received within rlf-TimersAndConstants:

2> not update its values of the timers and constants in ue-TimersAndConstants except for the value of timer T300;

. . .

5.3.10.0 General

The UE shall:

. . .

1> if the received radioResourceConfigDedicated includes the rlf-TimersAndConstants:

2> reconfigure the values of timers and constants as specified in 5.3.10.7;

. . .

5.3.10.7 Radio Link Failure Timers and Constants Reconfiguration

The UE shall:

1> if the received rlf-TimersAndConstants is set to release:

2> use values for timers T301, T310, T311 and constants N310, N311, as included in ue-TimersAndConstants received in SystemInformationBlockType2 (or SystemInformationBlockType2-NB in NB-IoT);

1> else:

2> reconfigure the value of timers and constants in accordance with received rlf-TimersAndConstants;

1> if the received rlf-TimersAndConstantsSCG is set to release:

2> stop timer T313, if running, and

2> release the value of timer t313 as well as constants n313 and n314;

1> else:

2> reconfigure the value of timers and constants in accordance with received rlf-TimersAndConstantsSCG;

. . .

5.3.10.11 SCG Dedicated Resource Configuration

The UE shall:

. . .

1> if the received radioResourceConfigDedicatedSCG includes the rlf-TimersAndConstantsSCG:

2> reconfigure the values of timers and constants as specified in 5.3.10.7;

. . .

5.3.11.1 Detection of Physical Layer Problems in RRC_CONNECTED

The UE shall:

1> upon receiving N310 consecutive "OOS" indications for the PCell from lower layers while neither T300, T301, T304 nor T311 is running:

2> start timer T310;

1> upon receiving N313 consecutive "OOS" indications for the PSCell from lower layers while T307 is not running:

2> start T313;

NOTE: Physical layer monitoring and related autonomous actions do not apply to SCells except for the PSCell.

5.3.11.2 Recovery of Physical Layer Problems

Upon receiving N311 consecutive "IS" indications for the PCell from lower layers while T310 is running, the UE shall:

1> stop timer T310;

1> stop timer T312, if running;

NOTE 1: In this case, the UE maintains the RRC connection without explicit signaling, i.e., the UE maintains the entire radio resource configuration.

NOTE 2: Periods in time where neither "IS" nor "OOS" is reported by layer 1 do not affect the evaluation of the number of consecutive "IS" or "OOS" indications.

Upon receiving N314 consecutive "IS" indications for the PSCell from lower layers while T313 is running, the UE shall:

1> stop timer T313;

* End excerpt from 3GPP specification *

In addition, FIG. 6 shows an exemplary ASN.1 data structure (also taken from 3GPP TS 36.331) defines an RRC RLF-TimersAndConstants information element (IE) containing UE-specific timers and constants applicable for UEs in RRC_CONNECTED state. Definitions of certain fields in FIG. 6 are provided in the tables below.

| RLF-TimersAndConstants field descriptions |
|---|
| n3xy |
| Constants are described in section 7.4. n1 corresponds with 1, n2 corresponds with 2 and so on. |
| t3xy |
| Timers are described in section 7.3. Value ms0 corresponds with 0 ms, ms50 corresponds with 50 ms and so on. E-UTRAN configures RLF-TimersAndConstants-r13 only if UE supports ce-ModeB. UE shall use the extended values t3xy-v1310 and t3xy-v1330, if present, and ignore the values signaled by t3xy-r9. |

| Timer | Start | Stop | At expiry |
|---|---|---|---|
| T301 NOTE1 | Transmission of RRCConnectionRe-estabilshmentRequest | Reception of RRCConnectionReestablishment or RRCConnectionReestablishmentReject message as well as when the selected cell becomes unsuitable | Go to RRC_IDLE |
| T310 NOTE1 NOTE2 | Upon detecting physical layer problems for the PCell i.e., upon receiving N310 consecutive OOS indications from lower layers | Upon receiving N311 consecutive IS indications from lower layers for the PCell, upon triggering the handover procedure and upon initiating the connection re-establishment procedure | If security is not activated: go to RRC_IDLE else: initiate the connection re-establishment procedure |
| T311 NOTE1 | Upon initiating the RRC connection re-establishment procedure | Selection of a suitable E-UTRA cell or a cell using another RAT. | Enter RRC_IDLE |
| T313 NOTE2 | Upon detecting physical layer problems for the PSCell i.e., upon receiving N313 consecutive OOS indications from lower layers | Upon receiving N314 consecutive IS indications from lower layers for the PSCell, upon initiating the connection re-establishment procedure, upon SCG release and upon receiving RRCConnectionReconfiguration including MobilityControlInfoSCG | Inform E-UTRAN about the SCG radio link failure by initiating the SCG failure information procedure as specified in 5.6.13. |

NOTE1:
Only the timers marked with "NOTE1" are applicable to NB-IOT.
NOTE2:
The behaviour as specified in 7.3.2 applies

| Constant | Usage |
|---|---|
| N310 | Maximum number of consecutive "OOS" indications for the PCell received from lower layers |
| N311 | Maximum number of consecutive "IS" indications for the PCell received from lower layers |
| N313 | Maximum number of consecutive "OOS" indications for the PSCell received from lower layers |
| N314 | Maximum number of consecutive "IS" indications for the PSCell received from lower layers |

An RLF reporting procedure was introduced as part of MRO for NR Rel-16. In this procedure, a UE logs relevant information at the time of RLF and later reports such information to the network via a target cell to which the UE ultimately connects (e.g., after reestablishment). The procedure not only introduced new RRC signaling between UE and the network (e.g., a target gNB hosting the target cell), but also introduced signaling between nodes in the network (e.g., XnAP signaling specified in 3GPP TS 38.423). For example, a gNB receiving an RLF report could forward some or all of the report to the gNB in which the RLF originated. In general, the UE-reported RLF information can include any of the following:

- Measurement quantities (RSRP, RSRQ) of the last serving cell (PCell).
- Measurement quantities of the neighbor cells in different frequencies of different RATs (e.g., EUTRA, UTRA, GERAN, CDMA2000).
- Measurement quantity (RSSI) associated to WLAN APs.
- Measurement quantity (RSSI) associated to Bluetooth beacons.
- Location information, if available (including location coordinates and velocity)
- Globally unique identity of the last serving cell, if available, otherwise the PCI and the carrier frequency of the last serving cell.
- Tracking area code of the PCell.
- Time elapsed since the last reception of the 'Handover command' message.
- C-RNTI used in the previous serving cell.
- Whether or not the UE was configured with a DRB having QCI=1.

Rel-16 defined various MRO use cases involving various failure scenarios during mobility procedures. These defined failure scenarios include the following:

- Intra-system Too Late Handover: An RLF occurs after the UE has stayed for a long period of time in the cell; the UE attempts to re-establish the radio link connection in a different cell.
- Intra-system Too Early Handover: An RLF occurs shortly after a successful handover from a source cell to a target cell or a handover failure occurs during the handover procedure; the UE attempts to re-establish the radio link connection in the source cell.
- Intra-system Handover to Wrong Cell: An RLF occurs shortly after a successful handover from a source cell to a target cell or a handover failure occurs during the handover procedure; the UE attempts to re-establish the radio link connection in a cell other than the source cell and the target cell.

For NR, the UE's RLF detection and reporting of RLF-related parameters is specified in 3GPP TS 38.331 (v16.0.0) section 5.3.10, relevant portions of which are given below. All sub-clauses referenced below are found in the same document.

* Begin excerpt from 3GPP specification *

5.3.10.3 Detection of Radio Link Failure

The UE shall:

1> if any DAPS bearer is configured and T304 is running:
  2> upon T310 expiry in source SpCell; or
  2> upon random access problem indication from source MCG MAC; or
  2> upon indication from source MCG RLC that the maximum number of retransmissions has been reached; or
  2> upon consistent uplink LBT failure indication from source MCG MAC:
    3> consider radio link failure to be detected for the source MCG i.e. source RLF;
    3> suspend the transmission of all DRBs in the source MCG;
    3> reset MAC for the source MCG;
    3> release the source connection.
1> else:
  2> during a DAPS handover: the following only applies for the target PCell;
  2> upon T310 expiry in PCell; or
  2> upon T312 expiry in PCell; or
  2> upon random access problem indication from MCG MAC while neither T300, T301, T304, T311 nor T319 are running; or
  2> upon indication from MCG RLC that the maximum number of retransmissions has been reached; or
  2> if connected as an IAB-node, upon BH RLF indication received on BAP entity from the MCG; or
  2> upon consistent uplink LBT failure indication from MCG MAC while T304 is not running:
    3> if the indication is from MCG RLC and CA duplication is configured and activated for MCG, and for the corresponding logical channel allowedServingCells only includes SCell(s):
      4> initiate the failure information procedure as specified in 5.7.5 to report RLC failure.
    3> else:
      4> consider radio link failure to be detected for the MCG i.e. RLF;
      4> discard any segments of segmented RRC messages stored according to 5.7.6.3; NOTE: Void.
      4> if AS security has not been activated:
        5> perform the actions upon going to RRC_IDLE as specified in 5.3.11, with release cause 'other';
      4> else if AS security has been activated but SRB2 and at least one DRB or, for IAB, SRB2, have not been setup:
        5> store the radio link failure information in the VarRLF-Report as described in subclause 5.3.10.5;
        5> perform the actions upon going to RRC_IDLE as specified in 5.3.11, with release cause 'RRC connection failure';
      4> else:
        5> store the radio link failure information in the VarRLF-Report as described in subclause 5.3.10.5;
        5> if T316 is configured; and
        5> if SCG transmission is not suspended; and
        5> if PSCell change is not ongoing (i.e. timer T304 for the NR PSCell is not running in case of NR-DC or timer T307 of the E-UTRA PSCell is not running as specified in TS 36.331 [10], clause 5.3.10.10, in NE-DC):

6> initiate the MCG failure information procedure as specified in 5.7.3b to report MCG radio link failure.

5> else:

6> initiate the connection re-establishment procedure as specified in 5.3.7.

The UE may discard the radio link failure information, i.e., release the UE variable VarRLF-Report, 48 hours after the radio link failure is detected.

5.3.10.5 RLF Report Content Determination

The UE shall determine the content in the VarRLF-Report as follows:

1> clear the information included in VarRLF-Report, if any;

1> set the plmn-IdentityList to include the list of EPLMNs stored by the UE (i.e., includes the RPLMN);

1> set the measResultLastServCell to include the cell level RSRP, RSRQ and the available SINR, of the source PCell (in case HO failure) or PCell (in case RLF) based on the available SSB and CSI-RS measurements collected up to the moment the UE detected failure;

1> if the SS/PBCH block-based measurement quantities are available:

2> set the rsIndexResults in measResultLastServCell to include all the available measurement quantities of the source PCell (in case HO failure) or PCell (in case RLF), ordered such that the highest SS/PBCH block RSRP is listed first if SS/PBCH block RSRP measurement results are available, otherwise the highest SS/PBCH block RSRQ is listed first if SS/PBCH block RSRQ measurement results are available, otherwise the highest SS/PBCH block SINR is listed first, based on the available SS/PBCH block based measurements collected up to the moment the UE detected failure;

1> if the CSI-RS based measurement quantities are available:

2> set the rsIndexResults in measResultLastServCell to include all the available measurement quantities of the source PCell (in case HO failure) or PCell (in case RLF), ordered such that the highest CSI-RS RSRP is listed first if CSI-RS RSRP measurement results are available, otherwise the highest CSI-RS RSRQ is listed first if CSI-RS RSRQ measurement results are available, otherwise the highest CSI-RS SINR is listed first, based on the available CSI-RS based measurements collected up to the moment the UE detected failure;

1> set the ssbRLMConfigBitmap and/or csi-rsRLMConfigBitmap in measResultLastServCell to include the radio link monitoring configuration of the source PCell (in case HO failure) or PCell (in case RLF);

1> for each of the configured measObjectNR in which measurements are available:

2> if the SS/PBCH block-based measurement quantities are available:

3> set the measResultListNR in measResultNeighCells to include all the available measurement quantities of the best measured cells, other than the source PCell (in case HO failure) or PCell (in case RLF), ordered such that the cell with highest SS/PBCH block RSRP is listed first if SS/PBCH block RSRP measurement results are available, otherwise the cell with highest SS/PBCH block RSRQ is listed first if SS/PBCH block RSRQ measurement results are available, otherwise the cell with highest SS/PBCH block SINR is listed first, based on the available SS/PBCH block based measurements collected up to the moment the UE detected failure;

4> for each neighbor cell included, include the optional fields that are available;

2> if the CSI-RS based measurement quantities are available:

3> set the measResultListNR in measResultNeighCells to include all the available measurement quantities of the best measured cells, other than the source PCell, ordered such that the cell with highest CSI-RS RSRP is listed first if CSI-RS RSRP measurement results are available, otherwise the cell with highest CSI-RS RSRQ is listed first if CSI-RS RSRQ measurement results are available, otherwise the cell with highest CSI-RS SINR is listed first, based on the available CSI-RS based measurements collected up to the moment the UE detected radio link failure;

4> for each neighbor cell included, include the optional fields that are available;

2> for each of the configured EUTRA frequencies in which measurements are available;

3> set the measResultListEUTRA in measResultNeighCells to include the best measured cells ordered such that the cell with highest RSRP is listed first if RSRP measurement results are available, otherwise the cell with highest RSRQ is listed first, and based on measurements collected up to the moment the UE detected failure;

4> for each neighbor cell included, include the optional fields that are available;

NOTE 1: The measured quantities are filtered by the L3 filter as configured in the mobility measurement configuration. The measurements are based on the time domain measurement resource restriction, if configured. Blacklisted cells are not required to be reported.

1> set the c-RNTI to the C-RNTI used in the source PCell (in case HO failure) or PCell (in case RLF);

1> if the failure is detected due to reconfiguration with sync failure as described in 5.3.5.8.3, set the fields in VarRLF-report as follows:

2> set the connectionFailureType to hof;

2> if last RRCReconfiguration message including reconfigurationWithSync concerned a failed intra-RAT handover (NR to NR):

3> set the nrFailedPCellId in failedPCellId to the global cell identity and tracking area code, if available, and otherwise to the physical cell identity and carrier frequency of the target PCell of the failed handover;

2> else if last MobilityFromNRCommand concerned a failed inter-RAT handover from NR to E-UTRA and if the UE supports Radio Link Failure Report for Inter-RAT MRO (NR to EUTRA):

3> set the eutraFailedPCellId in failedPCellId to the global cell identity and tracking area code, if available, and otherwise to the physical cell identity and carrier frequency of the target PCell of the failed handover;

2> include nrPreviousCell in previousPCellId and set it to the global cell identity and tracking area code of the PCell where the last RRCReconfiguration message including reconfigurationWithSync was received;

2> set the timeConnFailure to the elapsed time since reception of the last RRCReconfiguration message including the reconfigurationWithSync;

1> else if the failure is detected due to radio link failure as described in 5.3.10.3, set the fields in VarRLF-report as follows:

2> set the connectionFailureType to rlf;

2> set the rlf-Cause to the trigger for detecting radio link failure in accordance with clause 5.3.10.4;

2> set the nrFailedPCellId in failedPCellId to the global cell identity and the tracking area code, if available, and otherwise to the physical cell identity and carrier frequency of the PCell where radio link failure is detected;

2> if an RRCReconfiguration message including the reconfigurationWithSync was received before the connection failure:

3> if the last RRCReconfiguration message including the reconfigurationWithSync concerned an intra NR handover:

4> include the nrPreviousCell in previousPCellId and set it to the global cell identity and the tracking area code of the PCell where the last RRCReconfiguration message including reconfigurationWithSync was received;

4> set the timeConnFailure to the elapsed time since reception of the last RRCReconfiguration message including the reconfigurationWithSync;

3> else if the last RRCReconfiguration message including the reconfigurationWithSync concerned a handover to NR from E-UTRA and if the UE supports Radio Link Failure Report for Inter-RAT MRO:

4> include the eutraPreviousCell in previousPCellId and set it to the global cell identity and the tracking area code of the E-UTRA PCell where the last RRCReconfiguration message including reconfigurationWithSync was received embedded in E-UTRA RRC message MobilityFromEUTRA Command message as specified in TS 36.331 [10] clause 5.4.3.3;

4> set the timeConnFailure to the elapsed time since reception of the last RRCReconfiguration message including the reconfigurationWithSync embedded in E-UTRA RRC message MobilityFromEUTRACommand message as specified in TS 36.331 [10] clause 5.4.3.3;

1> if connectionFailureType is rlf and the rlf-Cause is set to randomAccessProblem or beamFailureRecoveryFailure; or 1> if connectionFailureType is hof 2> set the ra-InformationCommon to include the random-access related information as described in subclause 5.7.10.5;

1> if location information is available, set the content of locationInfo as follows:

2> if available, set the commonLocationInfo to include the detailed location information;

2> if available, set the bt-LocationInfo in locationInfo to include the Bluetooth measurement results, in order of decreasing RSSI for Bluetooth beacons;

2> if available, set the wlan-LocationInfo in locationInfo to include the WLAN measurement results, in order of decreasing RSSI for WLAN APs;

2> if available, set the sensor-LocationInfo in locationInfo to include the sensor measurement results;

The UE may discard the radio link failure information or handover failure information, i.e., release the UE variable VarRLF-Report, 48 hours after the radio link failure/handover failure is detected.

NOTE 2: In this clause, the term 'handover failure' has been used to refer to 'reconfiguration with sync failure'.

* End excerpt from 3GPP specification *

Additionally, for NR, the UE's RLF cause determination and reporting are specified in 3GPP TS 38.331 (v16.0.0) section 5.3.10.4, relevant portions of which are given below.

* Begin excerpt from 3GPP specification *

5.3.10.4 RLF Cause Determination

The UE shall set the rlf-Cause in the VarRLF-Report as follows:

1> if the UE declares radio link failure due to T310 expiry:

2> set the rlf-Cause as t310-Expiry;

1> else if the UE declares radio link failure due to the random-access problem indication from MCG MAC:

2> if the random-access procedure was initiated for beam failure recovery:

3> set the rlf-Cause as beamFailureRecoveryFailure;

2> else:

3> set the rlf-Cause as randomAccessProblem;

1> else if the UE declares radio link failure due to the reaching of maximum number of retransmissions from the MCG RLC:

2> set the rlf-Cause as rlc-MaxNumRetx;

1> else if the UE declares radio link failure due to consistent uplink LBT failures:

2> set the rlf-Cause as lbtFailure;

1> else if the IAB-MT declares radio link failure due to RLF recovery failure over the backhaul link:

2> set the rlf-Cause as bh-rlfRecoveryFailure.

* End excerpt from 3GPP specification *

After the UE declares RLF and logs the relevant information for reporting (e.g., in a variable VarRLF-Report), the UE selects a target cell and if it succeeds with a reestablishment towards that target cell, the UE includes in the RRCReestablishmentComplete message an indication that it has an RLF report available. If the gNB serving the target cell wants to receive the RLF report, it sends the UE an UEInformationRequest message with a flag "rlf-ReportReq-r16". In response, the UE sends the gNB an UEInformationResponse message that includes the RLF report.

FIG. 6 (which includes FIGS. 6A-B) shows an ASN.1 data structure that defines an exemplary UEInformationResponse message sent by the UE in response to a UEInformationRequest message. In particular, the RLF-Report-r16 IE contains RLF reporting information relevant to the present discussion, including various fields described above.

Based on the contents of the RLF report (e.g., a globally unique identity of the last serving cell), the gNB serving the target cell (i.e., the UE's new serving cell) can determine the cell where the RLF originated and forward the RLF report to the source gNB serving that cell. Based on receiving this report, the source gNB can possibly tune the handover-related parameters (e.g., measurement report triggering thresholds) for that cell, including the parameters that led to the UE's RLF. Two different types of inter-node messages have been standardized in in 3GPP TS 38.423 for sending RLF reports between nodes: Failure indication and Handover report.

An NR UE in RRC_CONNECTED state can perform intra-RAT handovers between NR cells as well as inter-RAT handovers rom an NR source cell to a target cell that uses LTE (EUTRA FDD or TDD), UMTS (UTRA), or another 3GPP RAT. Inter-RAT handover from NR is triggered by a MobilityFromNRCommand message from the network (e.g., gNB) that includes a configuration of radio resources that have been allocated for the UE in the target cell of the target RAT. A failed inter-RAT handover to the target cell results in RRC connection re-establishment by the UE in another cell.

It has been proposed that the UE should store handover failure information if the UE fails to perform inter-RAT handover from NR to another RAT for particular reasons, including:

- when the UE is unable to comply with any part of the configuration included in the MobilityFromNRCommand message; or
- when there is a protocol error in the inter-RAT information included in the MobilityFromNRCommand message, causing the UE to fail the procedure according to the specifications applicable for the target RAT.

This is illustrated by the following excerpt of 3GPP TS 38.331 (v16.0.0). All sub-clauses referenced below are found in the same document.

* Begin excerpt from 3GPP specification *

5.4.3.5 Mobility from NR Failure

The UE shall:

1> if the UE does not succeed in establishing the connection to the target radio access technology:

2> if the targetRAT-Type in the received MobilityFromNRCommand is set to eutra and the UE supports Radio Link Failure Report for Inter-RAT MRO EUTRA:

3> store handover failure information in VarRLFReport according to 5.3.10.5;

2> if voiceFallbackIndication is included in the MobilityFromNRCommand message:

3> attempt to select an E-UTRA cell:

4> if a suitable E-UTRA cell is selected:

5> perform the actions upon going to RRC_IDLE as specified in 5.3.11, with release cause 'RRC connection failure';

4> else:

5> revert back to the configuration used in the source PCell;

5> initiate the connection re-establishment procedure as specified in subclause 5.3.7;

2> else:

3> revert back to the configuration used in the source PCell;

3> initiate the connection re-establishment procedure as specified in subclause 5.3.7;

1> else if the UE is unable to comply with any part of the configuration included in the MobilityFromNRCommand message; or 1> if there is a protocol error in the inter RAT information included in the MobilityFromNRCommand message, causing the UE to fail the procedure according to the specifications applicable for the target RAT:

2> if the targetRAT-Type in the received MobilityFromNRCommand is set to eutra and the UE supports Radio Link Failure Report for Inter-RAT MRO EUTRA:

3> store handover failure information in VarRLFReport according to 5.3.10.5;

2> revert back to the configuration used in the source PCell;

2> initiate the connection re-establishment procedure as specified in subclause 5.3.7.

* End excerpt from 3GPP specification *

However, the RLF cause determination and RLF report content determination specified in 3GPP TS 38.331 sections 5.3.10.4 and 5.3.10.5 (listed above) do not address either of the two inter-RAT handover failure conditions discussed above. This can cause confusion and/or ambiguity when the RLF report is received by the RAN node that re-established the UE's connection. Furthermore, when such information is forwarded to the RAN node serving the target cell where the failure occurred, that RAN node may not be able to determine the failure cause. As such, that RAN node may be unable to correctly tune its parameters and/or procedures to avoid and/or mitigate future failures or, more problematically, may tune certain parameters and/or procedures in a counterproductive manner.

Accordingly, embodiments of the present disclosure provide novel, flexible, and efficient techniques for a UE, upon inter-RAT mobility failure, to log the failure cause as part of a RLF report. Various RLF causes can logged and included in the report, including the two inter-RAT handover failure conditions discussed above. Consequently, upon receiving an RLF report with such information, a RAN node can unambiguously detect and/or determine the RLF cause, including the two inter-RAT handover failure conditions discussed above. Accordingly, appropriate action can be taken by the RAN node serving the source cell of the failed handover, to avoid requesting the same handover to the inter-RAT target cell of the failed handover. Also, the RAN node serving the source cell can indicate the failure cause to the RAN node serving the inter-RAT target cell, which can take appropriate action to avoid and/or mitigate the occurrence of this failure in subsequent handovers.

One group of embodiments are related to actions and/or operations by a UE. These are described in more detail below.

In various embodiments, the UE can detect a failure (e.g., RLF) during an inter-RAT mobility procedure (e.g., handover) initiated when the UE was being served by a source cell provided by a RAN node. The UE can store information associated with the failure, including a failure cause, type, or condition that can indicate that the failure occurred when the UE tried to receive or decode a mobility command from the source cell, or when the UE performed a mobility procedure to an inter-RAT target cell (i.e., of a different RAT than the source cell). As more detailed examples; the failure cause can indicate a failure that occurred when:

- the UE was unable to comply with any part of a configuration included in a mobility command (e.g., MobilityFromNRCommand, RRCReconfiguration, etc.); and/or
- there was a protocol error in the inter-RAT information included in the mobility command (e.g., MobilityFromNRCommand, RRCReconfiguration, etc.), causing the UE to fail the procedure according to the specifications applicable for the RAT used by the target cell.

The UE can send a failure report (e.g., RLF report), including this failure cause, to a RAN node serving a cell in which the UE reestablished a connection after the failed inter-RAT mobility procedure.

In various embodiments, the inter-RAT mobility procedure can be handover (HO), conditional handover (CHO), DAPS handover, DC setup (e.g., SN addition), DC modification, etc. As such, the mobility command resulting in the failure can be any command appropriate for the particular mobility procedure during which the failure occurred. In some embodiments, the UE can log the particular type of inter-RAT mobility procedure during which the failure occurred (e.g., inter-RAT HO).

In some embodiments, when the UE is in DC and the failure during the inter-RAT mobility procedure occurs at the SN/SCG, the particular failure causes can be logged and sent in an SN-related failure report, such as SCGFailureInformation. Likewise, when the UE is in DC and the failure during the inter-RAT mobility procedure occurs at the MN/MCG, the particular failure causes can be logged and sent in an MN-related failure report, such as MCGFailureInformation.

In some embodiments, the above information can be represented implicitly. For example, the UE may include in the RLF report that the failure was due to handover failure but omit information about performed random access or about random access in another RAT. Based on the information included and omitted, the network can figure out that the UE failure was due to handover failure associated with an inter-RAT HO, and that the UE had problems with the MobilityFromNRCommand since random access was not performed (at least not in the other RAT). Optionally, the network can also figure out the target cell of the other RAT from eutraFailedPCellId, if the UE includes it.

Another group of embodiments are related to actions and/or operations by RAN nodes. These are described in more detail below.

In some embodiments, the RAN node serving the source cell for the failed handover (also referred to as "source RAN node") can receive a failure report (e.g., RLF report) containing a failure cause, type, or condition that can indicate that a failure occurred when the UE tried to receive or decode a mobility command from the source cell, or when the UE performed a mobility procedure to an inter-RAT target cell (i.e., of a different RAT than the source cell). As more detailed examples, the failure cause can indicate a failure that occurred when:

- the UE was unable to comply with any part of a configuration included in a mobility command (e.g., MobilityFromNRCommand, RRCReconfiguration, etc.); and/or
- there was a protocol error in the inter-RAT information included in the mobility command (e.g., MobilityFromNRCommand, RRCReconfiguration, etc.), causing the UE to fail the procedure according to the specifications applicable for the RAT used by the target cell.

In some embodiments, based on this failure cause, the source RAN node can refrain from requesting subsequent mobility procedures towards the inter-RAT target cell that was the source of the failed mobility procedure for the UE.

In some embodiments, the source RAN node can send the failure cause to a RAN node serving the inter-RAT target cell, facilitating this RAN node to take appropriate action to avoid and/or mitigate the same failure cause in subsequent mobility procedures toward the inter-RAT target cell.

In some embodiments, the RAN node that receives the report directly from the UE (i.e., the RAN node serving the cell in which the UE reestablished a connection after the failed inter-RAT mobility procedure) can detect that the failure cause is a protocol error in the inter-RAT information included in the mobility command. This RAN node can forward this information to the RAN node serving the inter-RAT target cell, which provided the mobility command to the UE (via the source cell). For example, this RAN node can forward the information to the RAN node serving the cell identified by the failedPCellId field included in the RLF report, since this cell/RAN node generated the mobility command that caused the protocol error in the UE.

Techniques of the present disclosure may also be embodied in a 3GPP specification. For example, the specification of RLF cause determination and RLF report content determination in 3GPP TS 38.331 section 5.3.10 (and listed above) can be enhanced with these novel techniques based on the following text (in which less relevant parts are omitted).

* Begin proposed text for 3GPP specification *

5.3.10.4 RLF Cause Determination

The UE shall set the rlf-Cause in the VarRLF-Report as follows:

1> else if the UE declares radio link failure because it was unable to comply with any part of the configuration included in the MobilityFromNRCommand message; or 2> set the rlf-Cause as unableToComply.

1> else if the UE declares radio link failure because there was a protocol error in the inter RAT information included in the MobilityFromNR Command message, causing the UE to fail the procedure according to the specifications applicable for the target RAT 2> set the rlf-Cause as protocolError.

5.3.10.5 RLF Report Content Determination

The UE shall determine the content in the VarRLF-Report as follows:

. . .

1> if the failure is detected due to reconfiguration with sync failure as described in 5.3.5.8.3, set the fields in VarRLF-report as follows:

2> if last RRCReconfiguration message including reconfigurationWithSync concerned a failed intra-RAT handover (NR to NR):

3> set the connectionFailureType to hof;

3> set the nrFailedPCellId infailedPCellId to the global cell identity and tracking area code, if available, and otherwise to the physical cell identity and carrier frequency of the target PCell of the failed handover;

2> else if last MobilityFromNRCommand concerned a failed inter-RAT handover from NR to E-UTRA and if the UE supports Radio Link Failure Report for Inter-RAT MRO (NR to EUTRA):

3> set the eutraFailedPCellId infailedPCellId to the global cell identity and tracking area code, if available, and otherwise to the physical cell identity and carrier frequency of the target PCell of the failed handover;

3> set the connectionFailureType to inter-RAT-hof;

. . .

The UE may discard the radio link failure information or handover failure information, i.e., release the UE variable VarRLF-Report, 48 hours after the radio link failure/handover failure is detected.

NOTE 2: In this clause, the term 'handover failure' has been used to refer to 'reconfiguration with sync failure'.

* End proposed text for 3GPP specification *

In addition, FIG. 7 shows an ASN.1 data structure for an exemplary RLF-Report-r16 IE according to certain embodiments of the present disclosure. This exemplary IE includes a connectionFailureType-r16 field that has been augmented with another enumerated type of "inter-RAT-ho". Additionally, this exemplary IE includes a rlf-Cause-r16 field that includes two additional enumerated causes of "unableToComply" and "protocolError". These correspond to the two inter-RAT handover failure conditions discussed above.

Note that the exemplary IE shown in FIG. 7 can replace the conventional RLF-Report-r16 IE in the UEInformation-Response message shown in FIG. 6.

Figures 8, 9:
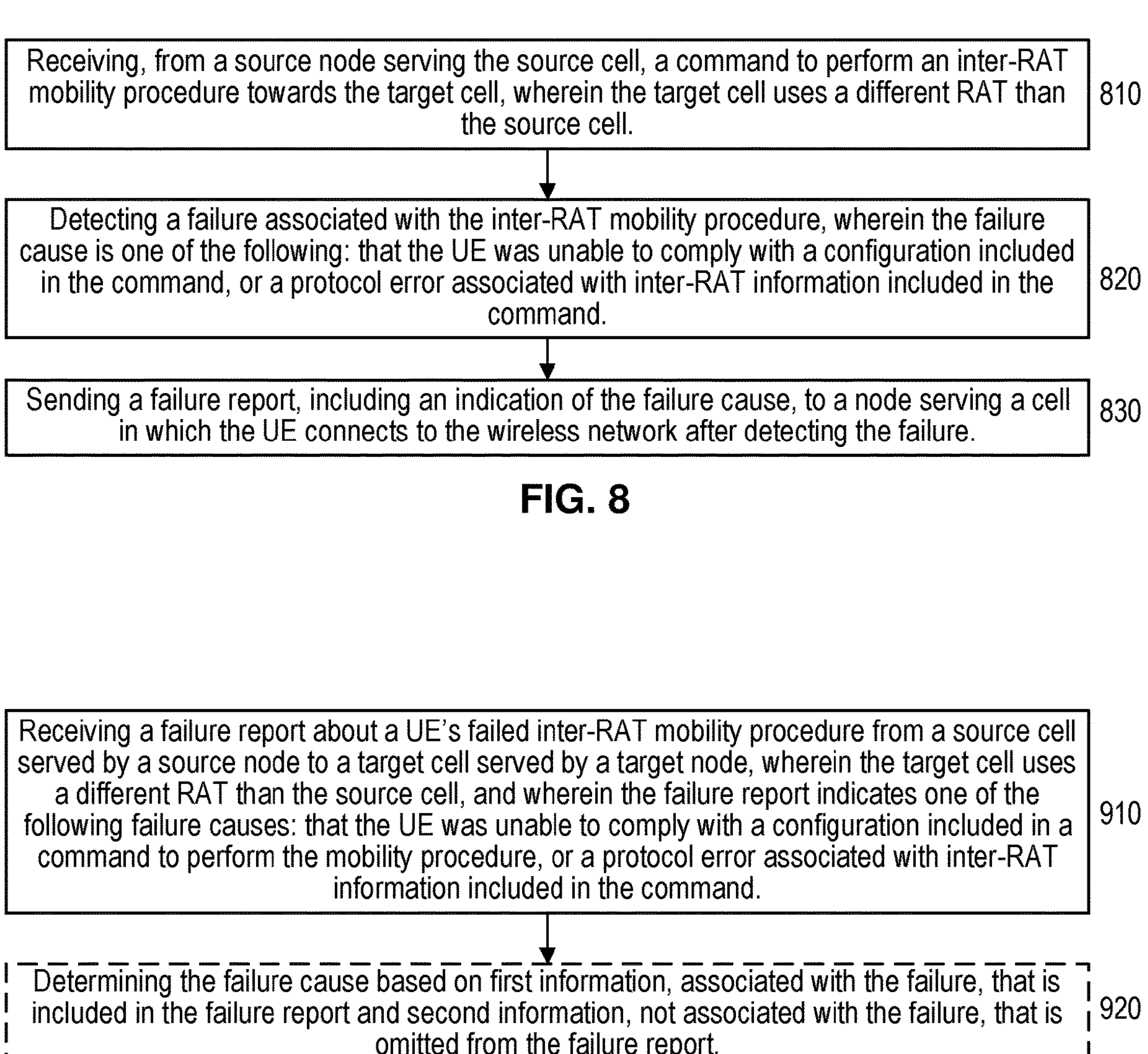
FIG. 8 shows a flow diagram of an exemplary method (e.g., procedure) for a UE (e.g., wireless device), according to various embodiments of the present disclosure.
FIG. 9 shows a flow diagram of an exemplary method (e.g., procedure) for a network node (e.g., base station, eNB, gNB, ng-eNB, etc.), according to various embodiments of the present disclosure.

The embodiments described above can be further illustrated with reference to FIGS. 8-9, which show exemplary methods (e.g., procedures) for UEs and network nodes, respectively. Put differently, various features of the operations described below correspond to various embodiments described above. Furthermore, the exemplary methods shown in FIGS. 8-9 can be used cooperatively to provide various benefits, advantages, and/or solutions to problems, including those described herein. Although FIGS. 8-9 show specific blocks in particular orders, the operations of the exemplary methods can be performed in different orders than shown and can be combined and/or divided into blocks with different functionality than shown. Optional blocks or operations are indicated by dashed lines.

In particular, FIG. 8 shows a flow diagram of an exemplary method (e.g., procedure) for reporting failure of an inter-RAT mobility procedure from a source cell to a target cell in a wireless network (e.g., E-UTRAN, NG-RAN), according to various embodiments of the present disclosure. The exemplary method shown in FIG. 8 can be performed by a UE (e.g., wireless device, MTC device, NB-IoT device, modem, etc. or component thereof) such as described elsewhere herein.

The exemplary method can include the operations of block 810, in which the UE can receive, from a source node serving the source cell, a command to perform an inter-RAT mobility procedure towards the target cell. The target cell uses a different RAT than the source cell. The exemplary method can also include the operations of block 820, in which the UE can detect a failure associated with the inter-RAT mobility procedure, where the failure cause is one of the following:

- that the UE was unable to comply with a configuration included in the command, or
- a protocol error associated with inter-RAT information included in the command.

The exemplary method can also include the operations of block 830, in which the UE can send a failure report, including an indication of the failure cause, to a node serving a cell in which the UE re-establishes a connection with the wireless network after the failed inter-RAT mobility procedure. In some embodiments, the failure report can be a radio link failure (RLF) report (e.g., RLF-Report-r16).

In some embodiments, the inter-RAT mobility procedure can be one of the following: handover, conditional handover, DAPS handover, DC setup, or DC modification. In some embodiments, the source cell uses an NR RAT, and the target cell uses a UTRA RAT or an E-UTRA RAT. In other embodiments, the source cell uses an E-UTRA RAT, and the target cell uses an NR RAT. In some embodiments, the failure report can also include a failure type indication, which indicates that the failure is associated with an inter-RAT handover.

In some embodiments, the UE can be in DC with an MCG and an SCG before receiving the command (e.g., in block 810), such that the failure is associated with either the MCG or the SCG. In such embodiments, one of the following applies to the failure report:

- it can be a message specific to the cell group associated with the failure (e.g., SCGFailureInformation or SCGFailureInformation); or
- it indicates whether the failure is associated with the MCG or with the SCG.

In some embodiments, the indication of the failure cause can be an explicit indication in the failure report or an implicit indication that is based on including first information associated with the failure (i.e., in the failure report) and omitting second information not associated with the failure (i.e., from the failure report). In some of these embodiments, the (included) first information can include an indication of handover failure (e.g., as in legacy RLF-Report-r16) and the (omitted) second information can be information about random access to the target cell (e.g., indicating that no random access was performed). In some embodiments, the first information can also include an identity of the target cell (e.g., eutraFailedPCellId).

In addition, FIG. 9 shows a flow diagram of an exemplary method (e.g., procedure) for handling failed inter-RAT mobility procedures of a UEs in a wireless network, according to various embodiments of the present disclosure. The exemplary method shown in FIG. 9 can be performed by a network node (e.g., base station, eNB, gNB, ng-eNB, etc., or component thereof) serving a cell in the wireless network (e.g., E-UTRAN, NG-RAN), such as network nodes described elsewhere herein.

The exemplary method can include the operations of block 910, in which the network node can receive a failure report about a UE's failed inter-RAT mobility procedure from a source cell served by a source node to a target cell served by a target node. The target cell uses a different RAT than the source cell. The failure report also indicates one of the following failure causes:

- that the UE was unable to comply with a configuration included in a command to perform the mobility procedure, or
- a protocol error associated with inter-RAT information included in the command.

In some embodiments, the failure report can be a radio link failure (RLF) report (e.g., RLF-Report-r16). The exemplary method can also include the operations of block 930, in which the network node can, based on the failure cause indication, perform one or more operations that prevent failures in subsequent mobility procedures involving the source cell and/or the target cell.

In some embodiments, the failure report can be received by the source node from a node serving a further cell in which the UE connected to the wireless network after the failed inter-RAT mobility procedure. In other words, in these embodiments, the source node is the network node performing the exemplary method. In such embodiments, the one or more operations performed in block 930 can include the operations of sub-blocks 931 and/or 932. In sub-block 931, the network node can refrain from requesting subsequent mobility procedures towards the target cell for UEs served by the source cell. In sub-block 932, the network node can send the failure cause indication to the target node. This can facilitate corrections and/or changes by the target node for subsequent mobility procedure commands sent to UEs, e.g., to prevent configuration problems and/or protocol errors.

In other embodiments, the failure report can be received from the UE by a node serving a further cell in which the UE connected to the wireless network after the failed inter-RAT mobility procedure. In other words, in these embodiments, the node serving the further cell is the network node performing the exemplary method. In such embodiments, the one or more operations performed in block 930 can include the operations of sub-blocks 933, 934, and/or 935. In sub-block 933, the network node can send the failure report to the source node (e.g., serving the source cell). In sub-block 934, the network node can determine the target node based on an identifier of the target cell (i.e., where the failure occurred) included in the failure report. In sub-block 935, when the indicated failure cause is the protocol error, the network node can send the failure cause indication the to the determined target node. This can facilitate corrections and/or changes by the target node for subsequent mobility procedure commands sent to UEs, e.g., to prevent configuration problems and/or protocol errors.

In some embodiments, the inter-RAT mobility procedure can be one of the following: handover, conditional handover, DAPS handover, DC setup, or DC modification. In some embodiments, the source cell uses an NR RAT, and the target cell uses a UTRA RAT or an E-UTRA RAT. In other embodiments, the source cell uses an E-UTRA RAT, and the target cell uses an NR RAT. In some embodiments, the failure report can also include a failure type indication, which indicates that the failure is associated with an inter-RAT handover.

In some embodiments, the UE can be in DC with an MCG and an SCG before the failed inter-RAT mobility procedure, which is associated with either the MCG or the SCG. In such embodiments, one of the following applies to the failure report:

it can be a message specific to the cell group associated with the failure (e.g., SCGFailureInformation or SCGFailureInformation); or it indicates whether the failure is associated with the MCG or with the SCG.

In some embodiments, the indication of the failure cause can be an explicit indication in the failure report. In other embodiments, the exemplary method can also include the operations of block 920, where the network node can determine the failure cause (e.g., implicitly) based on: first information associated with the failure, that is included in the failure report; and second information, not associated with the failure, that is omitted from the failure report. In some of these embodiments, the (included) first information can include an indication of handover failure (e.g., as in legacy RLF-Report-r16) and the (omitted) second information can be information about random access to the target cell (e.g., indicating that no random access was performed). In some embodiments, the first information can also include an identity of the target cell (e.g., eutraFailedPCellId).

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 10:
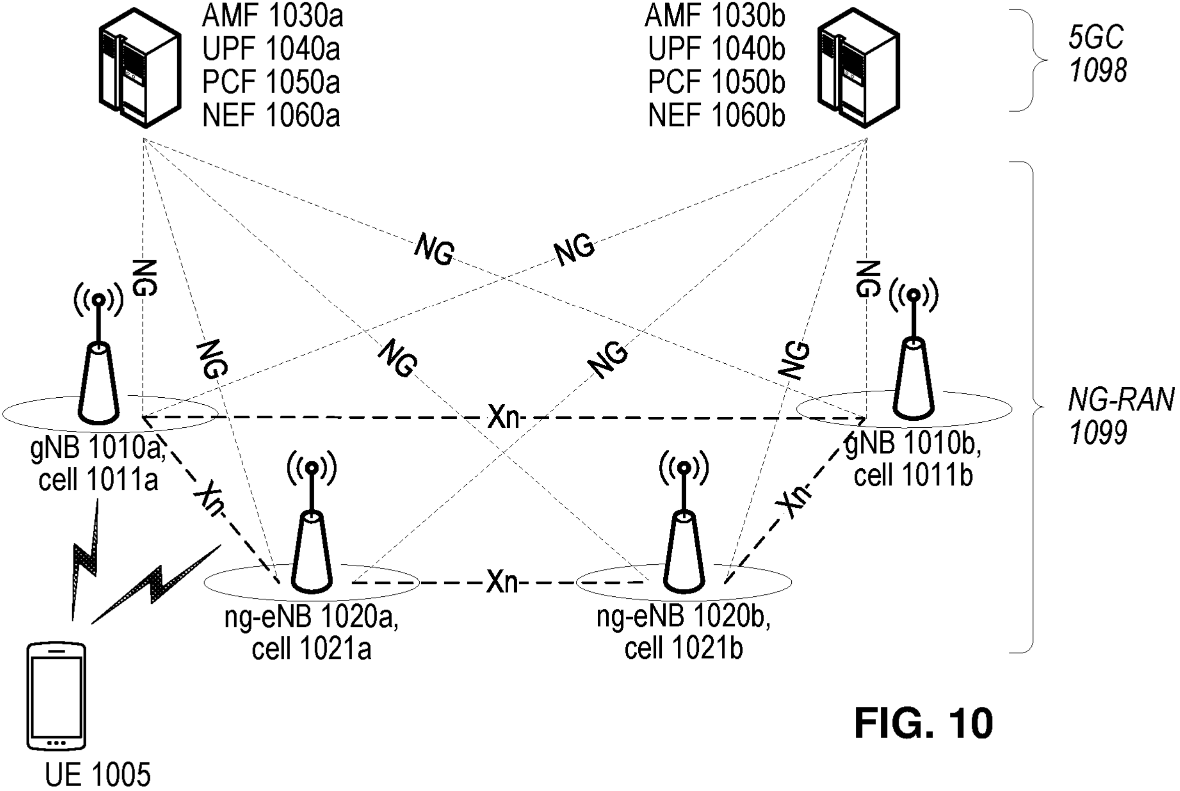
FIG. 10 shows a high-level view of an exemplary 5G network architecture.

FIG. 10 shows a high-level view of an exemplary 5G network architecture, including a Next Generation Radio Access Network (NG-RAN) 1099 and a 5G Core (5GC) 1098. As shown in the figure, NG-RAN 1099 can include gNBs 1010 (e.g., 1010*a,b*) and ng-eNBs 1020 (e.g., 1020*a, b*) that are interconnected with each other via respective Xn interfaces. The gNBs and ng-eNBs are also connected via the NG interfaces to 5GC 1098, more specifically to the AMF (Access and Mobility Management Function) 1030 (e.g., AMFs 1030*a,b*) via respective NG-C interfaces and to the UPF (User Plane Function) 1040 (e.g., UPFs 1040*a,b*) via respective NG-U interfaces. Moreover, the AMFs 1030*a,b* can communicate with one or more policy control functions (PCFs, e.g., PCFs 1050*a,b*) and network exposure functions (NEFs, e.g., NEFs 1060*a,b*).

Each of the gNBs 1010 can support the NR radio interface including frequency division duplexing (FDD), time division duplexing (TDD), or a combination thereof. In contrast, each of ng-eNBs 1020 can support the LTE radio interface but, unlike conventional LTE eNBs (such as shown in FIG. 1), connect to the 5GC via the NG interface. Each of the gNBs and ng-eNBs can serve a geographic coverage area including one more cells, including cells 1011*a-b* and 1021*a-b* shown as exemplary in FIG. 10. As mentioned above, the gNBs and ng-eNBs can also use various directional beams to provide coverage in the respective cells. Depending on the particular cell in which it is located, a UE 1005 can communicate with the gNB or ng-eNB serving that particular cell via the NR or LTE radio interface, respectively.

Each of gNBs 1010*a,b* can include a central (or centralized) unit (CU or gNB-CU) and one or more distributed (or decentralized) units (DU or gNB-DU). CUs are logical nodes that host higher-layer protocols and perform various gNB functions such controlling the operation of DUs. Likewise, DUs are logical nodes that hosts lower-layer protocols and can include various subsets of the gNB functions, depending on the functional split. As such, each of the CUs and DUs can include various circuitry needed to perform their respective functions, including processing circuitry, communication interface circuitry (e.g., for communication with UEs via the Uu radio interface and with other network nodes via the Xn interface), and power supply circuitry. A gNB-CU connects to its gNB-DUs over respective F1 logical interfaces, but a gNB-CU and connected gNB-DUs are only visible to other gNBs and the 5GC as a gNB. In other words, the F1 interface is not visible beyond a gNB-CU.

FIG. 16 shows a block diagram of an exemplary wireless device or user equipment (UE) 1600 (hereinafter referred to as "UE 1600") according to various embodiments of the present disclosure, including those described above with reference to other figures. For example, UE 1600 can be configured by execution of instructions, stored on a computer-readable medium, to perform operations corresponding to one or more of the exemplary methods and/or procedures described above.

UE 1100 can include a processor 1110 (also referred to as "processing circuitry") that can be operably connected to a program memory 1120 and/or a data memory 1130 via a bus 1170 that can comprise parallel address and data buses, serial ports, or other methods and/or structures known to those of ordinary skill in the art. Program memory 1120 can store software code, programs, and/or instructions (collectively shown as computer program product 1121 in FIG. 11) that, when executed by processor 1110, can configure and/or facilitate UE 1100 to perform various operations, including operations described below. For example, execution of such instructions can configure and/or facilitate UE 1100 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1140, user interface 1150, and/or control interface 1160.

As another example, processor 1110 can execute program code stored in program memory 1120 that corresponds to MAC, RLC, PDCP, and RRC layer protocols standardized by 3GPP (e.g., for NR and/or LTE). As a further example, processor 1110 can execute program code stored in program memory 1120 that, together with radio transceiver 1140, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1110 can execute program code stored in program memory 1120 that, together with radio transceiver 1140, implements device-to-device (D2D) communications with other compatible devices and/or UEs.

Program memory 1120 can also include software code executed by processor 1110 to control the functions of UE 1100, including configuring and controlling various components such as radio transceiver 1140, user interface 1150, and/or host interface 1160. Program memory 1120 can also comprise one or more application programs and/or modules comprising computer-executable instructions embodying any of the exemplary methods and/or procedures described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1120 can comprise an external storage arrangement (not shown) remote from UE 1100, from which the instructions can be downloaded into program memory 1120 located within or removably coupled to UE 1100, so as to enable execution of such instructions.

Data memory 1130 can include memory area for processor 1110 to store variables used in protocols, configuration, control, and other functions of UE 1100, including operations corresponding to, or comprising, any of the exemplary methods and/or procedures described herein. Moreover, program memory 1120 and/or data memory 1130 can include non-volatile memory (e.g., flash memory), volatile memory (e.g., static or dynamic RAM), or a combination thereof. Furthermore, data memory 1130 can comprise a memory slot by which removable memory cards in one or more formats (e.g., SD Card, Memory Stick, Compact Flash, etc.) can be inserted and removed.

Persons of ordinary skill will recognize that processor 1110 can include multiple individual processors (including, e.g., multi-core processors), each of which implements a portion of the functionality described above. In such cases, multiple individual processors can be commonly connected to program memory 1120 and data memory 1130 or individually connected to multiple individual program memories and or data memories. More generally, persons of ordinary skill in the art will recognize that various protocols and other functions of UE 1100 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1140 can include radio-frequency transmitter and/or receiver functionality that facilitates the UE 1100 to communicate with other equipment supporting like wireless communication standards and/or protocols. In some embodiments, the radio transceiver 1140 includes one or more transmitters and one or more receivers that enable UE 1100 to communicate according to various protocols and/or methods proposed for standardization by 3GPP and/or other standards bodies. For example, such functionality can operate cooperatively with processor 1110 to implement a PHY layer based on OFDM, OFDMA, and/or SC-FDMA technologies, such as described herein with respect to other figures.

In some embodiments, radio transceiver 1140 includes one or more transmitters and one or more receivers that can facilitate the UE 1100 to communicate with various LTE, LTE-Advanced (LTE-A), and/or NR networks according to standards promulgated by 3GPP. In some embodiments of the present disclosure, the radio transceiver 1140 includes circuitry, firmware, etc. necessary for the UE 1100 to communicate with various NR, NR-U, LTE, LTE-A, LTE-LAA, UMTS, and/or GSM/EDGE networks, also according to 3GPP standards. In some embodiments, radio transceiver 1140 can include circuitry supporting D2D communications between UE 1100 and other compatible devices.

In some embodiments, radio transceiver 1140 includes circuitry, firmware, etc. necessary for the UE 1100 to communicate with various CDMA2000 networks, according to 3GPP2 standards. In some embodiments, the radio transceiver 1140 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1140 can include a transceiver that is capable of wired communication, such as by using IEEE 802.3 Ethernet technology. The functionality particular to each of these embodiments can be coupled with and/or controlled by other circuitry in the UE 1100, such as the processor 1110 executing program code stored in program memory 1120 in conjunction with, and/or supported by, data memory 1130.

User interface 1150 can take various forms depending on the particular embodiment of UE 1100 or can be absent from UE 1100 entirely. In some embodiments, user interface 1150 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1100 can comprise a tablet computing device including a larger touchscreen display. In such embodiments, one or more of the mechanical features of the user interface 1150 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1100 can be a digital computing device, such as a laptop computer, desktop computer, workstation, etc. that comprises a mechanical keyboard that can be integrated, detached, or detachable depending on the particular embodiment. Such a digital computing device can also comprise a touch screen display. Many embodiments of the UE 1100 having a touch screen display are capable of receiving user inputs, such as inputs related to exemplary methods and/or procedures described herein or otherwise known to persons of ordinary skill in the art.

In some embodiments, UE 1100 can include an orientation sensor, which can be used in various ways by features and functions of UE 1100. For example, the UE 1100 can use outputs of the orientation sensor to determine when a user has changed the physical orientation of the UE 1100's touch screen display. An indication signal from the orientation sensor can be available to any application program executing on the UE 1100, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various embodiments of the present disclosure.

A control interface 1160 of the UE 1100 can take various forms depending on the particular embodiment of UE 1100 and of the particular interface requirements of other devices that the UE 1100 is intended to communicate with and/or control. For example, the control interface 1160 can comprise an RS-232 interface, a USB interface, an HDMI interface, a Bluetooth interface, an IEEE ("Firewire") interface, an $I^2C$ interface, a PCMCIA interface, or the like. In some embodiments of the present disclosure, control interface 1160 can comprise an IEEE 802.3 Ethernet interface such as described above. In some embodiments of the present disclosure, the control interface 1160 can comprise analog interface circuitry including, for example, one or more digital-to-analog (D/A) and/or analog-to-digital (A/D) converters.

Figure 11:
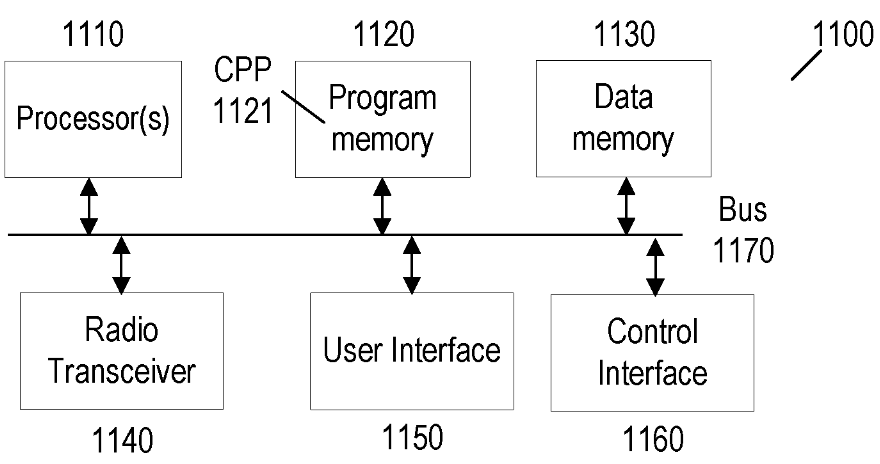
FIG. 11 shows a block diagram of an exemplary wireless device or UE, according to various embodiments of the present disclosure.

Persons of ordinary skill in the art can recognize the above list of features, interfaces, and radio-frequency communication standards is merely exemplary, and not limiting to the scope of the present disclosure. In other words, the UE 1100 can comprise more functionality than is shown in FIG. 11 including, for example, a video and/or still-image camera, microphone, media player and/or recorder, etc. Moreover, radio transceiver 1140 can include circuitry necessary to communicate using additional radio-frequency communication standards including Bluetooth, GPS, and/or others. Moreover, the processor 1110 can execute software code stored in the program memory 1120 to control such additional functionality. For example, directional velocity and/or position estimates output from a GPS receiver can be available to any application program executing on the UE 1100, including various exemplary methods and/or computer-readable media according to various embodiments of the present disclosure.

Figure 12:
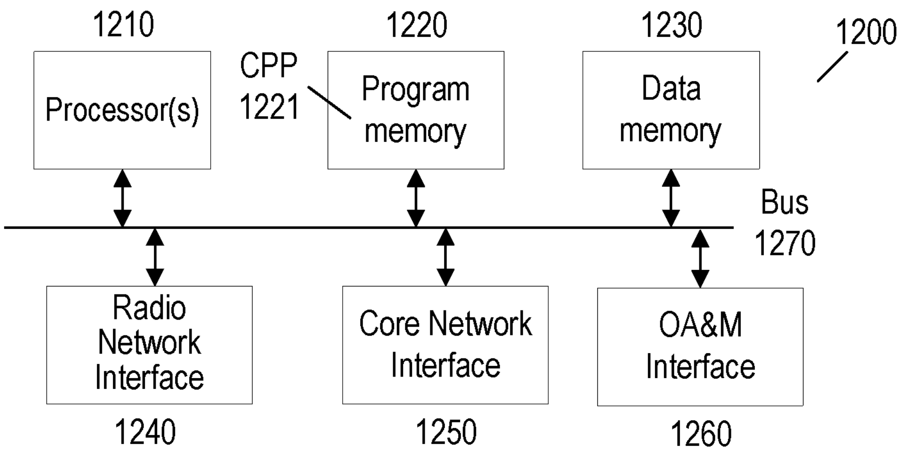
FIG. 12 shows a block diagram of an exemplary network node, according to various embodiments of the present disclosure.

FIG. 12 shows a block diagram of an exemplary network node 1200 according to various embodiments of the present disclosure, including those described above with reference to other figures. For example, exemplary network node 1200 can be configured by execution of instructions, stored on a computer-readable medium, to perform operations corresponding to one or more of the exemplary methods and/or procedures described above. In some embodiments, network node 1200 can comprise a base station, eNB, gNB, or one or more components thereof. For example, network node 1200 can be configured as a central unit (CU) and one or more distributed units (DUs) according to NR gNB architectures specified by 3GPP. More generally, the functionally of network node 1200 can be distributed across various physical devices and/or functional units, modules, etc.

Network node 1200 can include processor 1210 (also referred to as "processing circuitry") that is operably connected to program memory 1220 and data memory 1230 via bus 1270, which can include parallel address and data buses, serial ports, or other methods and/or structures known to those of ordinary skill in the art.

Program memory 1220 can store software code, programs, and/or instructions (collectively shown as computer program product 1221 in FIG. 12) that, when executed by processor 1210, can configure and/or facilitate network node 1200 to perform various operations. For example, execution of such stored instructions can configure network node 1200 to communicate with one or more other devices using protocols according to various embodiments of the present disclosure, including one or more exemplary methods and/or procedures discussed above. Program memory 1220 can also comprise software code executed by processor 1210 that can facilitate and specifically configure network node 1200 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with radio network interface 1240 and core network interface 1250. By way of example and without limitation, core network interface 1250 can comprise the S1 interface and radio network interface 1240 can comprise the Uu interface, as standardized by 3GPP. Program memory 1220 can further comprise software code executed by processor 1210 to control the functions of network node 1200, including configuring and controlling various components such as radio network interface 1240 and core network interface 1250.

Data memory 1230 can comprise memory area for processor 1210 to store variables used in protocols, configuration, control, and other functions of network node 1200. As such, program memory 1220 and data memory 1230 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1210 can include multiple individual processors (not shown), each of which implements a portion of the functionality described above. In such case, multiple individual processors may be commonly connected to program memory 1220 and data memory 1230 or individually connected to multiple individual program memories and/or data memories. More generally, persons of ordinary skill will recognize that various protocols and other functions of network node 1200 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1240 can comprise transmitters, receivers, signal processors, ASICs, antennas, beamforming units, and other circuitry that enables network node 1200 to communicate with other equipment such as, in some embodiments, a plurality of compatible user equipment (UE). In some embodiments, interface 1240 can also enable network node 1200 to communicate with compatible satellites of a satellite communication network. In some embodiments, radio network interface 1240 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1240. According to further embodiments of the present disclosure, the radio network interface 1240 can comprise a PHY layer based on OFDM, OFDMA, and/or SC-FDMA technologies. In some embodiments, the functionality of such a PHY layer can be provided cooperatively by radio network interface 1240 and processor 1210 (including program code in memory 1220).

Core network interface 1250 can comprise transmitters, receivers, and other circuitry that enables network node 1200 to communicate with other equipment in a core network such as, in some embodiments, circuit-switched (CS) and/or packet-switched Core (PS) networks. In some embodiments, core network interface 1250 can comprise the S1 interface standardized by 3GPP. In some embodiments, core network interface 1250 can comprise the NG interface standardized by 3GPP. In some embodiments, core network interface 1250 can comprise one or more interfaces to one or more AMFs, SMFs, SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1250 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1200 can include hardware and/or software that configures and/or facilitates network node 1200 to communicate with other network nodes in a RAN, such as with other eNBs, gNBs, ng-eNBs, en-gNBs, IAB nodes, etc. Such hardware and/or software can be part of radio network interface 1240 and/or core network interface 1250, or it can be a separate functional unit (not shown). For example, such hardware and/or software can configure and/or facilitate network node 1200 to communicate with other RAN nodes via the X2 or Xn interfaces, as standardized by 3GPP.

OA&M interface 1260 can comprise transmitters, receivers, and other circuitry that enables network node 1200 to communicate with external networks, computers, databases, and the like for purposes of operations, administration, and maintenance of network node 1200 or other network equipment operably connected thereto. Lower layers of OA&M interface 1260 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1240, core network interface 1250, and OA&M interface 1260 may be multiplexed together on a single physical interface, such as the examples listed above.

Figure 13:
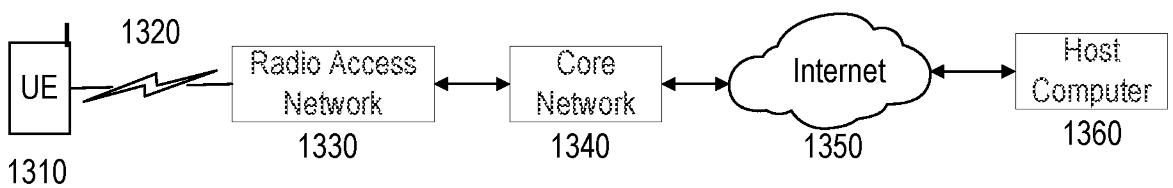
FIG. 13 shows a block diagram of an exemplary network configured to provide over-the-top (OTT) data services between a host computer and a UE, according to various embodiments of the present disclosure.

FIG. 13 is a block diagram of an exemplary communication network configured to provide over-the-top (OTT) data services between a host computer and a user equipment (UE), according to one or more embodiments of the present disclosure. UE 1310 can communicate with radio access network (RAN) 1330 over radio interface 1320, which can be based on protocols described above including, e.g., LTE, LTE-A, and 5G/NR. For example, UE 1310 can be configured and/or arranged as shown in other figures discussed above.

RAN 1330 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1330 can cooperatively operate using licensed and unlicensed spectrum. In some embodiments, RAN 1330 can include, or be capable of communication with, one or more satellites comprising a satellite access network.

RAN 1330 can further communicate with core network 1340 according to various protocols and interfaces described above. For example, one or more apparatus (e.g., base stations, eNBs, gNBs, ng-eNBs, etc.) comprising RAN 1330 can communicate to core network 1340 via core network interface 1650 described above. In some embodiments, RAN 1330 and core network 1340 can be configured and/or arranged as shown in other figures discussed above. For example, eNBs comprising an E-UTRAN 1330 can communicate with an EPC 1340 via an S1 interface. As another example, gNBs comprising an NG-RAN 1330 can communicate with a 5GC 1330 via an NG interface.

Core network 1340 can further communicate with an external packet data network, illustrated in FIG. 13 as Internet 1350, according to various protocols and interfaces known to persons of ordinary skill in the art. Many other devices and/or networks can also connect to and communicate via Internet 1350, such as exemplary host computer 1360. In some embodiments, host computer 1360 can communicate with UE 1310 using Internet 1350, core network 1340, and RAN 1330 as intermediaries. Host computer 1360 can be a server (e.g., an application server) under ownership and/or control of a service provider. Host computer 1360 can be operated by the OTT service provider or by another entity on the service provider's behalf.

For example, host computer 1360 can provide an over-the-top (OTT) packet data service to UE 1310 using facilities of core network 1340 and RAN 1330, which can be unaware of the routing of an outgoing/incoming communication to/from host computer 1360. Similarly, host computer 1360 can be unaware of routing of a transmission from the host computer to the UE, e.g., the routing of the transmission through RAN 1330. Various OTT services can be provided using the exemplary configuration shown in FIG. 13 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 13 can also include measurement procedures and/or sensors that monitor network performance metrics including data rate, latency and other factors that are improved by embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The embodiments described herein provide efficient and unambiguous techniques for reporting causes of failed UE inter-RAT mobility procedures in a radio link failure (RLF) report. By receiving such information, a RAN node can unambiguously detect and/or determine the RLF cause, including various inter-RAT handover failure conditions discussed herein. Accordingly, various RAN nodes can take remedial action based on this information, including fixing the condition that caused the failure and/or refraining from future handovers to the target cell in which the failure occurred. Consequently, such techniques can reduce and/or eliminate subsequent inter-RAT mobility failures. When used in LTE or NR UEs (e.g., UE 1310) and eNBs or gNBs (e.g., gNBs comprising RAN 1330), embodiments described herein can provide various improvements, benefits, and/or advantages to OTT service providers and end-users, including more consistent data throughout and fewer delays without excessive UE energy consumption, service interruptions, and/or other reductions in user experience.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Example embodiments of the techniques and apparatus described herein include, but are not limited to, the following enumerated examples:

A1. A method, for a user equipment (UE), of reporting failure of an inter-radio access technology (RAT) mobility procedure from a source cell to a target cell in a wireless network, the method comprising:
  - receiving, from a source node serving the source cell, a command to perform an inter-RAT mobility procedure towards the target cell, wherein the target cell uses a different RAT than the source cell;
  - detecting a failure associated with the inter-RAT mobility procedure, wherein the failure cause is one of the following:
    - that the UE was unable to comply with a configuration included in the command, or
    - a protocol error associated with inter-RAT information included in the command; and
  - sending a failure report, including an indication of the failure cause, to a node serving a cell in which the UE re-establishes a connection with the wireless network after the failed inter-RAT mobility procedure.

A2. The method of embodiment A1, wherein the inter-RAT mobility procedure is one of the following: handover, conditional handover, dual-connectivity (DC) setup, DC modification.

A3. The method of any of embodiments A1-A2, wherein:
  - the source cell uses a New Radio (NR) RAT; and
  - the target cell uses a UTRA RAT or an evolved UTRA (E-UTRA) RAT.

A4. The method of any of embodiments A1-A3, wherein the failure report also includes a failure type indication, which indicates that the failure is associated with an inter-RAT handover.

A5. The method of any of embodiments A1-A4, wherein:
  - the UE is in dual connectivity with a master cell group (MCG) and a secondary cell group (SCG) before receiving the command;
  - the failure is associated with either the MCG or the SCG; and
  - one of the following applies to the failure report:
    - it is a message specific to the cell group associated with the failure; or
    - it indicates whether the failure is associated with the MCG or the SCG.

A6. The method of any of embodiments A1-A5, wherein the indication of the failure cause is one of the following:

an explicit indication in the failure report; or an implicit indication based on including first information associated with the failure and omitting second information not associated with the failure.

A7. The method of embodiment A6, wherein:

the first information includes an indication of handover failure; and the second information includes information about random access to the target cell.

A8. The method of embodiment A7, wherein the first information also includes an identity of the target cell.

A9. The method of any of embodiments A1-A8, wherein the failure report is a radio link failure (RLF) report.

B1. A method, for a network node, of handling failed inter-RAT mobility procedures of user equipment (UEs) in a wireless network, the method comprising:

receiving a failure report for a failed inter-RAT mobility procedure, by a user equipment (UE), from a source cell served by a source node to a target cell served by a target node, wherein the target cell uses a different RAT than the source cell, and wherein the failure report indicates one of the following failure causes:

that the UE was unable to comply with a configuration included in a command to perform the mobility procedure, or a protocol error associated with inter-RAT information included in the command; and based on the failure cause indication, performing one or more operations that prevent failures in subsequent mobility procedures involving the source cell and/or the target cell.

B2. The method of embodiment B1, wherein:

the failure report is received by the source node from a node serving a further cell in which the UE re-established a connection with the wireless network after the failed inter-RAT mobility procedure; and the one or more operations include one or more of the following:

refraining from requesting subsequent mobility procedures towards the target cell for UEs served by the source cell; and sending the failure cause indication the to the target node.

B3. The method of embodiment B1, wherein:

the failure report is received from the UE by a node serving a cell in which the UE re-established a connection with the wireless network after the failed inter-RAT mobility procedure; and the one or more operations include one or more of the following:

sending the failure report to the source node;

determining the target node based on an identifier of the target cell included in the failure report; and when the indicated failure cause is the protocol error, sending the failure cause indication the to the determined target node.

B4. The method of any of embodiments B1-B3, wherein the inter-RAT mobility procedure is one of the following: handover, conditional handover, dual-connectivity (DC) setup, DC modification.

B5. The method of any of embodiments B1-B4, wherein:

the source cell uses a New Radio (NR) RAT; and the target cell uses a UTRA RAT or an evolved UTRA (E-UTRA) RAT.

B6. The method of any of embodiments B1-B5, wherein the failure report also includes failure type indication, which indicates that the failure is associated with an inter-RAT handover.

B7. The method of any of embodiments B1-B6, wherein:

the UE was in dual connectivity with a master cell group (MCG) and a secondary cell group (SCG) before the failed inter-RAT mobility procedure, which is associated with either the MCG or the SCG; and one of the following applies to the failure report:

it is a message specific to the cell group associated with the inter-RAT mobility failure; or it indicates whether the failure is associated with the MCG or the SCG.

B8. The method of any of embodiments B1-B7, wherein the indication of the failure cause is an explicit indication in the failure report.

B9. The method of any of embodiments B1-B7, further comprising determining the failure cause based on first information associated with the failure, that is included in the failure report and second information, not associated with the failure, that is omitted from the failure report.

B10. The method of embodiment B8, wherein:

the first information includes an indication of handover failure; and the second information includes information about random access to the target cell.

B11. The method of embodiment B9, wherein the first information also includes an identity of the target cell.

B12. The method of any of embodiments B1-B12, wherein the failure report is a radio link failure (RLF) report.

C1. A user equipment (UE) configured to report failure of an inter-radio access technology (RAT) mobility procedure from a source cell to a target cell in a wireless network, the UE comprising:

radio transceiver circuitry configured to communicate with one or more network nodes in the wireless network; and processing circuitry operatively coupled to the radio transceiver circuitry, whereby the processing circuitry and the radio transceiver circuitry are configured to perform operations corresponding to any of the methods of embodiments A1-A9.

C2. A user equipment (UE) configured to report failure of an inter-radio access technology (RAT) mobility procedure from a source cell to a target cell in a wireless network, the UE being further configured to perform operations corresponding to any of the methods of embodiments A1-A9.

C3. A non-transitory, computer-readable medium storing computer-executable instructions that, when executed by processing circuitry of a user equipment (UE) configured to report failure of an inter-radio access technology (RAT) mobility procedure from a source cell to a target cell in a wireless network, configure the UE to perform operations corresponding to any of the methods of embodiments A1-A9.

C4. A computer program product comprising computer-executable instructions that, when executed by processing circuitry of a user equipment (UE) configured to report failure of an inter-radio access technology (RAT) mobility procedure from a source cell to a target cell in a wireless network, configure the UE to perform operations corresponding to any of the methods of embodiments A1-A9.

D1. A network node configured to handle failed inter-radio access technology (RAT) mobility procedures of user equipment (UEs) in a wireless network, the network node comprising:

radio network interface circuitry configured to communicate with UEs and with one or more other network nodes in the wireless network; and processing circuitry operatively coupled to the radio network interface circuitry, whereby the processing circuitry and the radio network interface circuitry are configured to perform operations corresponding to any of the methods of embodiments B1-B12.

D2. A network node configured to handle failed inter-radio access technology (RAT) mobility procedures of user equipment (UEs) in a wireless network, the network node being further configured to perform operations corresponding to any of the methods of embodiments B1-B12.

D3. A non-transitory, computer-readable medium storing computer-executable instructions that, when executed by processing circuitry of a network node configured to handle failed inter-radio access technology (RAT) mobility procedures of user equipment (UEs) in a wireless network, configure the network node to perform operations corresponding to any of the methods of embodiments B1-B12.

D4. A computer program product comprising computer-executable instructions that, when executed by processing circuitry of a network node configured to handle failed inter-radio access technology (RAT) mobility procedures of user equipment (UEs) in a wireless network, configure the network node to perform operations corresponding to any of the methods of embodiments B1-B12.

The invention claimed is:

1. A method for a user equipment, UE, to report failure of an inter-radio access technology (RAT) mobility procedure from a source cell to a target cell in a wireless network, the method comprising:

receiving, from a source node serving the source cell, a command to perform an inter-RAT mobility procedure towards the target cell, wherein the target cell uses a different RAT than the source cell;

detecting a failure associated with the inter-RAT mobility procedure, wherein the failure cause is one of the following:

that the UE was unable to comply with a configuration included in the command, or a protocol error associated with inter-RAT information included in the command; and sending a failure report, including an indication of the failure cause, to a node serving a cell in which the UE connected to the wireless network after detecting the failure, wherein the indication of the failure cause is one of the following:

an explicit indication of the failure cause, or an implicit indication of the failure cause based on the failure report indicating handover failure but omitting information about random access.

2. The method of claim 1, wherein the inter-RAT mobility procedure is one of the following: handover; conditional handover; dual active protocol stack (DAPS) handover; dual-connectivity (DC) setup; or DC modification.

3. The method of claim 1, wherein one of the following applies:

the source cell uses a New Radio (NR) RAT and the target cell uses a UTRA RAT or an evolved UTRA (E-UTRA) RAT; or the source cell uses an E-UTRA RAT and the target cell uses an NR RAT.

4. The method of claim 1 wherein one or more of the following applies:

the failure report is a radio link failure (RLF) report; and the failure report also includes a failure type indication, which indicates that the failure is associated with an inter-RAT handover.

5. The method of claim 1, wherein:

the UE is in dual connectivity with a master cell group (MCG) and a secondary cell group (SCG) before receiving the command;

the failure is associated with either the MCG or the SCG; and one of the following applies:

the failure report is a message specific to the cell group associated with the failure; or the failure report indicates whether the failure is associated with the MCG or the SCG.

6. The method of claim 1, wherein the implicit indication is further based on the failure report including an identity of the target cell.

7. A method for a network node to handle failed inter-RAT mobility procedures of user equipment, UEs, in a wireless network, the method comprising:

receiving a failure report about a UE's failed inter-RAT mobility procedure from a source cell served by a source node to a target cell served by a target node, wherein the target cell uses a different RAT than the source cell, and wherein the failure report indicates one of the following failure causes:

that the UE was unable to comply with a configuration included in a command to perform the inter-RAT mobility procedure, or a protocol error associated with inter-RAT information included in the command, wherein the indication of the failure cause is one of the following: an explicit indication of the failure cause, or an implicit indication of the failure cause based on the failure report indicating handover failure but omitting information about random access; and based on the failure cause indication, performing one or more operations that prevent failures in subsequent mobility procedures involving the source cell and/or the target cell.

8. The method of claim 7, wherein:

the failure report is received by the source node from a node serving a further cell in which the UE connected to the wireless network after the failed inter-RAT mobility procedure; and the one or more operations include one or more of the following:

refraining from requesting subsequent mobility procedures towards the target cell for UEs served by the source cell; and sending the failure cause indication to the target node.

9. The method of claim 7, wherein:

the failure report is received from the UE by a node serving a cell in which the UE connected to the wireless network after the failed inter-RAT mobility procedure; and the one or more operations include one or more of the following:

sending the failure report to the source node;

determining the target node based on an identifier of the target cell included in the failure report; and when the indicated failure cause is the protocol error, sending the failure cause indication the to the determined target node.

10. The method of claim 7, wherein the inter-RAT mobility procedure is one of the following: handover; conditional handover; dual active protocol stack (DAPS) handover; dual-connectivity (DC) setup; or DC modification.

11. The method of claim 7, wherein one of the following applies:

the source cell uses a New Radio (NR) RAT and the target cell uses a UTRA RAT or an evolved UTRA (E-UTRA) RAT; or the source cell uses an E-UTRA RAT and the target cell uses an NR RAT.

12. The method of claim 7, wherein one or more of the following applies:

the failure report is a radio link failure (RLF) report; and the failure report also includes a failure type indication, which indicates that the failure is associated with an inter-RAT handover.

13. The method of claim 7, wherein:

the UE was in dual connectivity (DC) with a master cell group (MCG) and a secondary cell group (SCG) before the failed inter-RAT mobility procedure, which is associated with either the MCG or the SCG; and one of the following applies:

the failure report is a message specific to the cell group associated with the inter-RAT mobility failure; or the failure report indicates whether the failure is associated with the MCG or the SCG.

14. The method of claim 7, wherein the implicit indication is further based on the failure report including an identity of the target cell.

15. A user equipment (UE) configured to report failure of an inter-radio access technology (RAT) mobility procedure from a source cell to a target cell in a wireless network, the UE comprising:

radio transceiver circuitry configured to communicate with one or more network nodes in the wireless network; and processing circuitry operatively coupled to the radio transceiver circuitry, whereby the processing circuitry and the radio transceiver circuitry are configured to:

receive, from a source node serving the source cell, a command to perform an inter-RAT mobility procedure towards the target cell, wherein the target cell uses a different RAT than the source cell;

detect a failure associated with the inter-RAT mobility procedure, wherein the failure cause is one of the following:

that the UE was unable to comply with a configuration included in the command, or a protocol error associated with inter-RAT information included in the command; and send a failure report, including an indication of the failure cause, to a node serving a cell in which the UE connected to the wireless network after detecting the failure, wherein the indication of the failure cause is one of the following:

an explicit indication of the failure cause, or an implicit indication of the failure cause based on the failure report indicating handover failure but omitting information about random access.

16. A network node configured to handle failed inter-radio access technology (RAT) mobility procedures of user equipment (UEs) in a wireless network, the network node comprising:

radio network interface circuitry configured to communicate with UEs and with one or more other network nodes in the wireless network; and processing circuitry operatively coupled to the radio network interface circuitry, whereby the processing circuitry and the radio network interface circuitry are configured to perform operations corresponding to the method of claim 7.

* * * * *